United States Patent
Naito

(10) Patent No.: US 8,411,421 B2
(45) Date of Patent: Apr. 2, 2013

(54) OPEN-CLOSE TYPE COMPACT ELECTRONIC DEVICE

(75) Inventor: Makoto Naito, Osaka (JP)

(73) Assignee: KYOCERA Corporation, Kyoto (JP)

( * ) Notice: Subject to any disclaimer, the term of this patent is extended or adjusted under 35 U.S.C. 154(b) by 219 days.

(21) Appl. No.: 12/919,326

(22) PCT Filed: Mar. 3, 2009

(86) PCT No.: PCT/JP2009/053940
§ 371 (c)(1), (2), (4) Date: Aug. 25, 2010

(87) PCT Pub. No.: WO2009/110454
PCT Pub. Date: Sep. 11, 2009

(65) Prior Publication Data
US 2011/0007465 A1    Jan. 13, 2011

(30) Foreign Application Priority Data

Mar. 5, 2008 (JP) ................................ 2008-054196

(51) Int. Cl.
H05K 5/00 (2006.01)
(52) U.S. Cl. ......... 361/679.01; 361/679.04; 361/679.39; 361/296; 361/727; 455/575.1; 455/575.4; 455/90; 455/90.3
(58) Field of Classification Search .................. None
See application file for complete search history.

(56) References Cited

U.S. PATENT DOCUMENTS

| | | | |
|---|---|---|---|
| 7,986,983 B2 * | 7/2011 | Harmon et al. | 455/575.4 |
| 2006/0128449 A1 * | 6/2006 | Park | 455/575.4 |
| 2007/0266524 A1 * | 11/2007 | Kitamura et al. | 16/280 |

FOREIGN PATENT DOCUMENTS

| | | |
|---|---|---|
| JP | 11-167354 | 6/1999 |
| JP | 11-341121 | 12/1999 |
| JP | 2007-166621 | 6/2007 |
| JP | 2008-271027 | 11/2008 |
| JP | 2008-271027 A | 11/2008 |
| KR | 10-0698131 B1 | 3/2007 |

OTHER PUBLICATIONS

Notice of Grounds for Rejection dated Apr. 13, 2012, issued in counterpart Korean Application No. 10-2010-7019276.
Office Action dated Jun. 12, 2012, issued in counterpart Japanese Application No. 2010-501908.

* cited by examiner

Primary Examiner — Yuwen Pan
Assistant Examiner — Fanghwa Wang
(74) Attorney, Agent, or Firm — Procopio, Cory, Hargreaves & Savitch LLP

(57) ABSTRACT

An open-close type compact electronic device includes a first housing and a second housing connected so that they can move relative to each other. The first housing is provided with a first display on its front surface while the second housing is provided with a second display on its front surface. The first and second housings can move relative to each other between a closed state where a front surface of the first display is covered by the second housing while a front surface of the second display is exposed and an open state where the front surfaces of the first and second displays are arranged on generally the same plane to be exposed. The first and second housings include respective contact surfaces, which are pressed against each other in the open state, thereby maintaining a posture of the second housing relative to the first housing.

10 Claims, 22 Drawing Sheets

OPEN-CLOSE TYPE COMPACT ELECTRONIC DEVICE

TECHNICAL FIELD

The present invention relates to compact electronic devices such as a portable telephone, and particularly to an open-close type compact electronic device comprising a first housing and a second housing which are connected to each other openably and closably.

BACKGROUND ART

In recent years, portable telephones have been multi-functionalized more and more, and along with this, information to be displayed on a display has become various. Therefore, the size of a screen of the display has been increased. However, since the size of the screen of the display is limited by the size of the housing, the increase in the size of the display has a limitation.

It has been proposed that in a display apparatus for a mobile, two housings are foldably connected to each other, and each of the housings includes a display arranged on an inner face thereof so as to display more information with the two screens.

Therefore, considered is a foldable portable telephone comprising a first housing and a second housing foldably connected to each other, having a configuration in which a display is arranged on an inner face of each of the first housing and the second housing, or a sliding portable telephone comprising a first housing and a second housing slidably connected to each other, having a configuration in which a display is arranged on a front face of each of the first housing and the second housing.

DISCLOSURE OF THE INVENTION

Problems to be Solved by the Invention

However, in the foldable portable telephone comprising the first housing and the second housing each provided with the display on the inner face thereof, the two displays are hidden when the housings are closed. Therefore, in order to enable information display at the time of telephone communication when the housings are closed, it is necessary to further arrange a third display on the face exposed with the housings closed. Thus, there is a problem of a complicated configuration.

In contrast, in the sliding portable telephone comprising the first housing and the second housing each provided with the display on the front face thereof, there is a difference in level between the two displays when the housings are open. Therefore, when an image is displayed over the two display screens, since the image is greatly divided into two, it could bring a feeling of strangeness particularly in the case of a continuous image.

A first object of the present invention is to provide an open-close type compact electronic device comprising a first housing and a second housing front surfaces of which can be flush with each other on generally the same plane with the housings open.

A second object of the present invention is to provide an open-close type compact electronic device comprising a first housing and a second housing which can display information without using a third display with the housings closed, and can keep continuousness of an image displayed over two displays with the housings open.

Means for Solving the Problem

An open-close type compact electronic device according to the present invention comprises a first housing 1 and a second housing 2 connected to each other by a connecting mechanism so that they can move relative to each other. The first housing 1 and the second housing 2 can move relative to each other between a closed state where a part or all of a front surface of the first housing 1 is covered by the second housing 2 and an open state where front surfaces of both the housings 1, 2 are arranged on generally the same plane to be exposed.

Also, the first housing 1 and the second housing 2 include respective contact surfaces 12, 22 to be in contact with each other by being urged by urging means in the open state. Both the contact surfaces come into contact with each other in the open state, thereby maintaining a posture of the second housing 2 relative to the first housing 1.

The open state where the front surfaces of both the housings 1, 2 are arranged on generally the same plane to be exposed is a state where the front surfaces of the housings 1, 2 are flush with each other on the same plane, or the front surfaces of the housings 1, 2 are arranged with a difference in level within a predetermined tolerable range.

It is desirable that the contact surface 12 of the first housing 1 and the contact surface 22 of the second housing 2 are in contact with each other by being urged by the urging means with a surface pressure of a certain value or higher.

With the open-close type compact electronic device described above, in a state where the second housing 2 is closed with respect to the first housing 1, a rear surface of the second housing 2 is arranged over the front surface of the first housing 1 to hide a part or all of the front surface of the first housing 1.

When the second housing 2 is opened from the closed state to the open state, the front surface of the first housing 1 and the front surface of the second housing 2 are both exposed. In this open state, the contact surface 22 of the second housing 2 comes into contact with the contact surface 12 of the first housing 1, and the housings 1, 2 are held at relative positions where the front surfaces thereof are flush with each other on generally the same plane.

Also, the open-close type compact electronic device in accordance with the present invention comprises the first housing 1 and the second housing 2 connected to each other by a connecting mechanism so that they can move relative to each other, and the first housing 1 is provided with a first display 11 on its front surface while the second housing 2 is provided with a second display 21 on its front surface.

In this open-close type compact electronic device, the first housing 1 and the second housing 2 can move relative to each other between a closed state where a front surface of the first display 11 is covered by the second housing 2 while a front surface of the second display 21 is exposed and an open state where the front surfaces of the first display 11 and the second display 21 are arranged on generally the same plane to be exposed.

Also, the first housing 1 and the second housing 2 include the respective contact surfaces 12, 22 to be in contact with each other by being urged by the urging means in the open state. Both the contact surfaces 12, 22 come into contact with each other in the open state, thereby maintaining a posture of the second housing 2 relative to the first housing 1.

The open state where the front surfaces of the first display 11 and the second display 21 are arranged on generally the same plane to be exposed is a state where the front surfaces of both the displays 11, 21 are flush with each other on the same plane, or the front surfaces of both the displays 11, 21 are arranged with a difference in level within a predetermined tolerable range.

It is desirable that the contact surface 12 of the first housing 1 and the contact surface 22 of the second housing 2 are in contact with each other by being urged by the urging means with a surface pressure of a certain value or higher.

With the open-close type compact electronic device described above, in a state where the second housing 2 is closed with respect to the first housing 1, a rear surface of the second housing 2 is arranged over the front surface of the first housing 1 to hide the first display 11.

In this state, the second display 21 provided on the front surface of the second housing 2 is exposed, and therefore, information can be displayed using the second display 21.

When the second housing 2 is opened from the closed state to the open state, the first display 11 is exposed, and the front surfaces of the first display 11 and the second display 21 are flush with each other on generally the same plane. In this open state, the contact surface 22 of the second housing 2 comes into contact with the contact surface 12 of the first housing 1, thereby maintaining a posture of the second housing 2 relative to the first housing 1. This ensures a constant positional relationship between screens of the displays 11, 12.

In this state, the screens of the first display 11 and the second display 21 are flush with each other on generally the same plane. Therefore, when an image is displayed over the screens of the two displays, it is possible to keep continuousness of the image.

In a particular embodiment, the relative movement from the closed state to the open state includes a sliding step in which the second housing 2 slides from the closed state along the front surface of the first housing 1 to reach an intermediate state, and a rotating step in which the second housing 2 rotates from the intermediate state to reach the open state.

The connecting mechanism includes a hinge mechanism 3 which guides the slide of the second housing 2 with respect to the first housing 1 in the sliding step and rotates the second housing 2 with respect to the first housing 1 in the rotating step. The hinge mechanism 3 includes therein a spring 35 urging the second housing 2 toward the closed state with respect to the first housing 1 in at least a final step of the rotating step. The spring 35 forms the urging means.

The hinge mechanism 3 comprises: a first cam piece 31 which is linked to the first housing 1 and slidable in a sliding direction of the second housing 2; an arm 37 which includes a tip end part linked to the second housing 2 so as to be rotatable relative thereto and a base end part around which the arm 37 can rotate about an axis perpendicular to the sliding direction of the second housing 2; and a second cam piece 32 which is linked to the base end part of the arm 37 so as not to be rotatable relative thereto. A cam face of the first cam piece 31 and a cam face of the second cam piece 32 are in sliding contact so as to be rotatable relative to each other. The cam pieces 31, 32 are urged by the spring 35 in such a direction that the cam faces are pressed to each other, and camming action of the cam faces drives the second housing 2 toward the closed state.

Alternatively, the hinge mechanism 3 comprises: a first cam piece 31 which is linked to the first housing 1 so as not to be rotatable relative thereto; an arm 37 which includes a tip end part linked to the second housing 2 so as to be rotatable relative thereto and slidable along the sliding direction of the second housing 2 and a base end part around which the arm 37 can rotate about an axis perpendicular to the sliding direction of the second housing 2; and a second cam piece 32 which is linked to the base end part of the arm 37 so as not to be rotatable relative thereto. A cam face of the first cam piece 31 and a cam face of the second cam piece 32 are in sliding contact so as to be rotatable relative to each other. The cam pieces 31, 32 are urged by the spring in such a direction that the cam faces are pressed to each other, and camming action of the cam faces drives the second housing 2 toward the closed state.

In another particular embodiment, the contact surfaces 12, 22 of the first housing 1 and the second housing 2 are formed so as to be parallel to the respective front surfaces of the first display 11 and the second display 21.

It is thereby possible to form the contact surfaces 12, 22 of the first housing 1 and the second housing 2 so as to be as large as possible, thereby more stabilizing the postures of the displays 11, 21 with the contact surfaces 12, 22 of the housings 1, 2.

Effect of the Invention

With the open-close type compact electronic device in accordance with the present invention, maintained is a constant relative position where the front surfaces of both housings are flush with each other on generally the same plane in a state where the housings are open.

Also, with the open-close type compact electronic device in accordance with the present invention, information can be displayed on the second display with the housings closed, and furthermore, with the housings open, information can be displayed on both the first and second displays, and continuousness of an image can be kept when the image is displayed over the displays.

Figure 1:
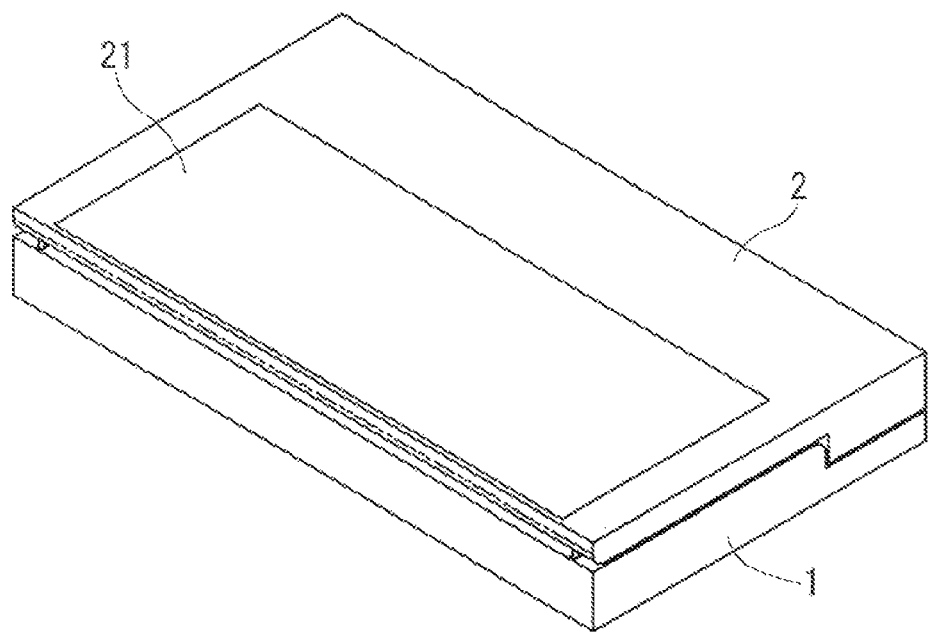
FIG. 1 is a perspective view of an open-close type compact electronic device in accordance with a first embodiment of the present invention with a second housing in a closed state.

EXPLANATION OF REFERENCE NUMERALS 1 first housing
11 first display
12 contact surface
13 groove
14 groove
2 second housing
21 second display
22 contact surface
24 groove
3 hinge mechanism
31 first cam piece
32 second cam piece
35 coil spring
37 arm
301 first hinge mechanism
302 second hinge mechanism
5 connector
6 connector
7 tension lever
8 cable

BEST MODE FOR CARRYING OUT THE INVENTION

Embodiments of the present invention is to be described in detail below with reference to the drawings.

Figure 6:
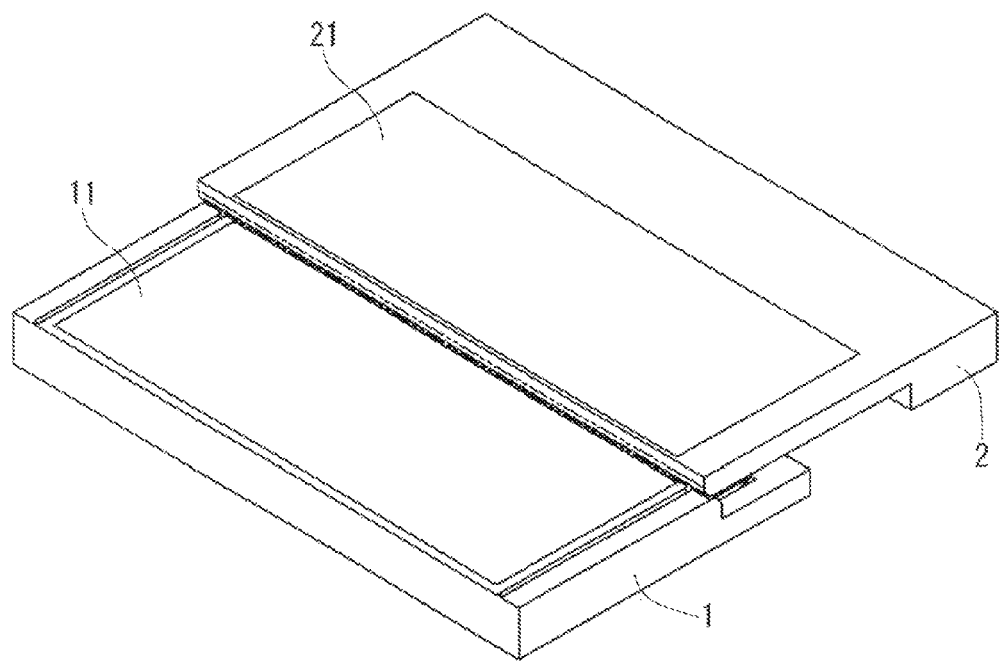
FIG. 6 is a perspective view of the open-close type compact electronic device in accordance with the first embodiment of the present invention with the second housing in an intermediate state.

An open-close type compact electronic device in accordance with a first embodiment of the present invention comprises a flat rectangular parallelepiped first housing 1 with a step and a flat rectangular parallelepiped second housing 2 with a step as shown in FIG. 6. The housings 1, 2 are connected so as to be movable relative to each other while they are arranged on one another.

Figure 16:
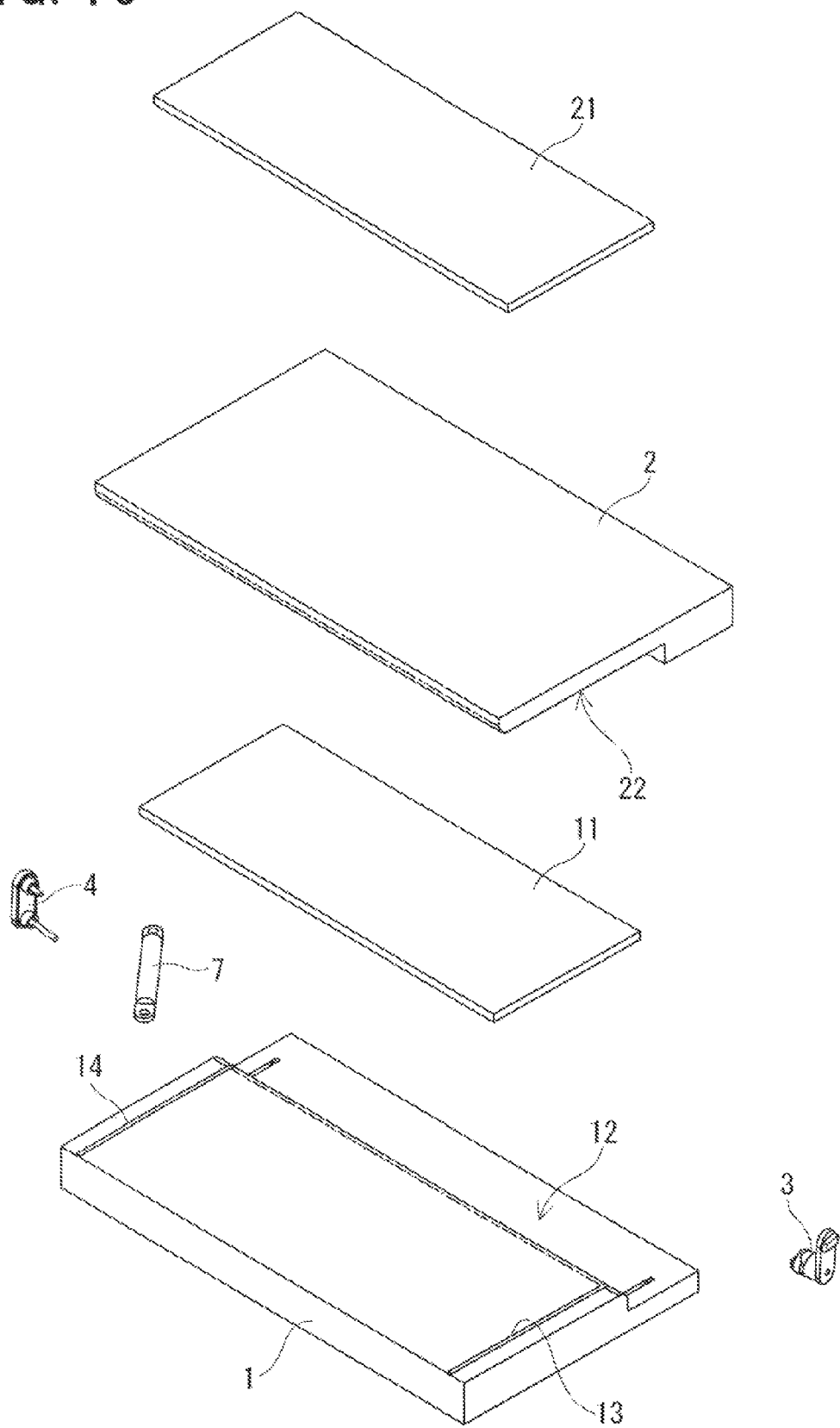
FIG. 16 is an exploded perspective view of the open-close type compact electronic device in accordance with the first embodiment of the present invention.

As shown in FIG. 16, a first display 11 is arranged on a front surface of the first housing 1, and a second display 21 is arranged on a front surface of the second housing 2.

Also, a contact surface 12 parallel to a front surface of the first display 11 is formed on the front surface of the first housing 1 behind an area where the first display 11 is located, and a contact surface 22 parallel to a front surface of the second display 21 is formed on a rear surface of the second housing 2 at a position overlapping an area where the second display 21 is located.

Thus, the first housing 1 and the second housing 2 can reciprocate among a closed state where the second housing 2 overlaps the first housing 1 so that the second housing 2 covers the first display 11 as shown in FIGS. 1 to 4, an intermediate state to which the second housing 2 slides along the front surface of the first display 11 of the first housing 1 to expose the first display 11 as shown in FIGS. 6 to 9, and an open state to which the second housing 2 rotates with respect to the first housing 1 so that the first display 11 and the second display 21 are flush with each other on the same plane as shown in FIGS. 11 to 14.

Figure 3:
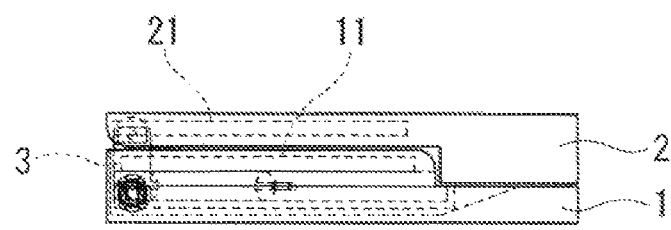
FIG. 3 is a right side view of the device in the same state as above.
Figure 4:
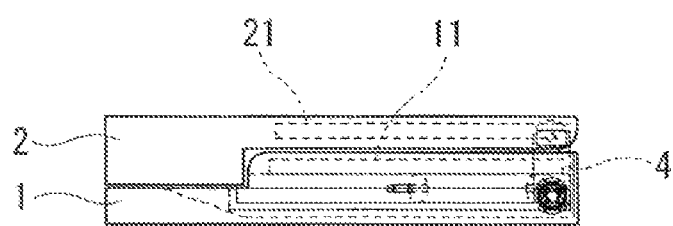
FIG. 4 is a left side view of the device in the same state as above.

As shown in FIG. 3, the first housing 1 and the second housing 2 are connected to each other by a hinge mechanism 3 on the right side, while, as shown in FIG. 4, the first housing 1 and the second housing 2 are connected to each other by a hinge mechanism 4 on the left side.

Figure 17:
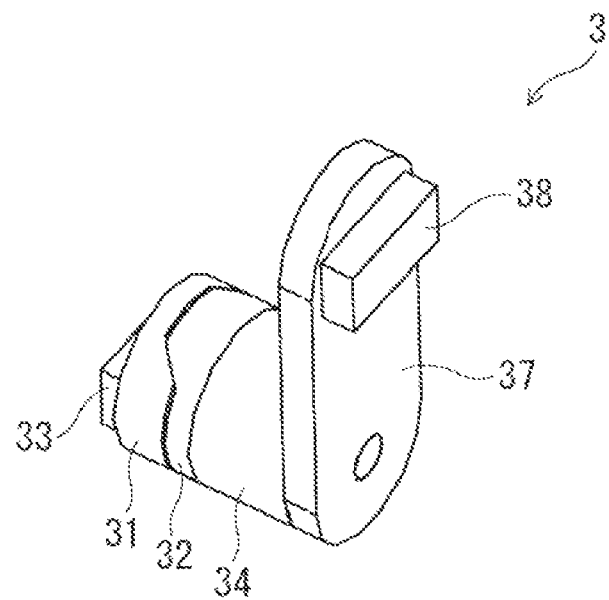
FIG. 17 is a perspective view of a right hinge mechanism.
Figure 18:
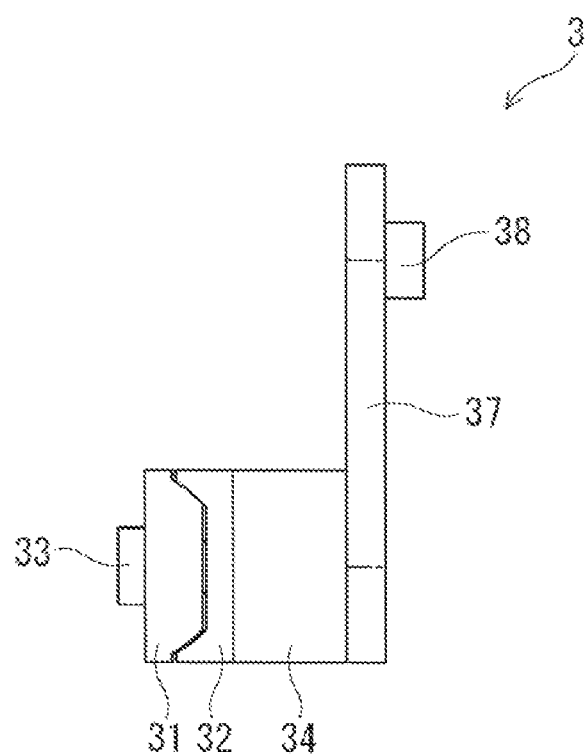
FIG. 18 is a front view of the hinge mechanism.
Figure 19:
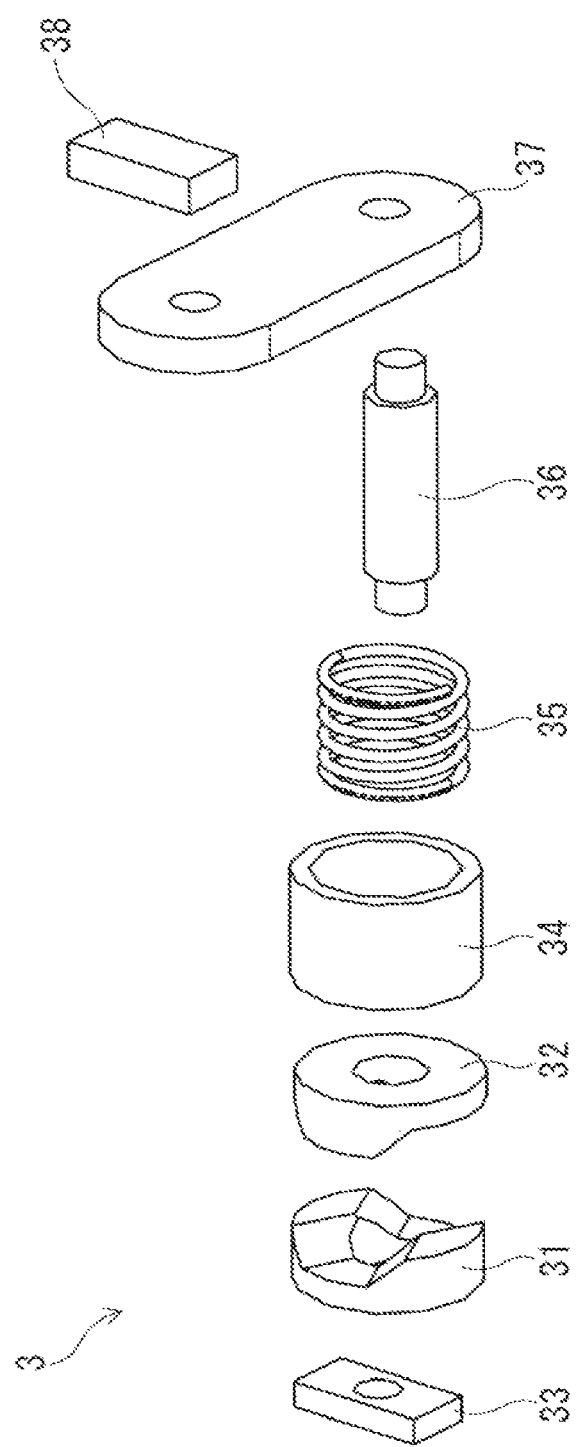
FIG. 19 is an exploded perspective view of the hinge mechanism.

As shown in FIGS. 17 to 19, the right hinge mechanism 3 comprises a first cam piece 31, a parallelepiped inner engaging piece 33 connected to the first cam piece 31 so as not to be rotatable relative thereto, a second cam piece 32 to be in sliding contact with the first cam piece 31, an arm 37 connected to the second cam piece 32 through a shaft 36 with an upright posture so as not to be rotatable relative thereto, a parallelepiped outer engaging piece 38 connected to a tip end part of the arm 37 so as to be rotatable relative thereto, a coil spring 35 pressing the second cam piece 32 against the first cam piece 31, and a cylindrical member 34 for accommodating the coil spring 35.

Figure 5:
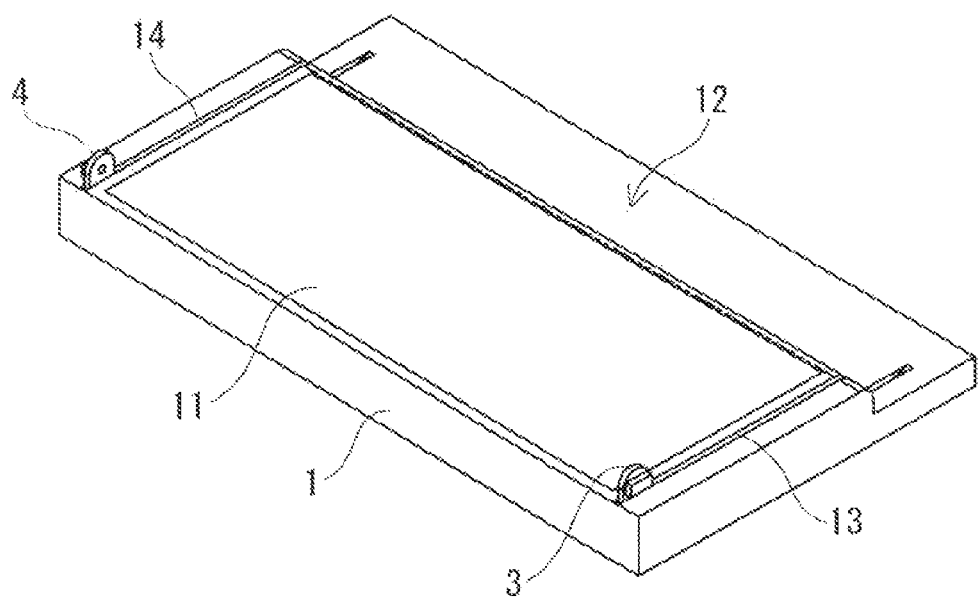
FIG. 5 is a perspective view indicating a position of a hinge mechanism of the device in the same state as above.

As shown in FIG. 5, a groove 13 extending in a sliding direction of the second housing 2 is formed in a right end part of the first housing 1. The right hinge mechanism 3 slidably engages with the groove 13, and the inner engaging piece 33 is connected to the first housing 1 so as not to be rotatable relative thereto and as to be slidable along the groove 13.

In contrast, the outer engaging piece 38 of the right hinge mechanism 3 is connected to the second housing 2 so as not to be rotatable relative thereto.

Figure 21:
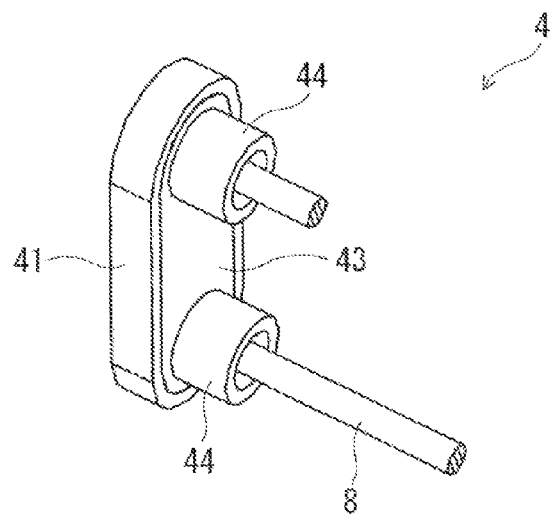
FIG. 21 is a perspective view of a left hinge mechanism.
Figure 22:
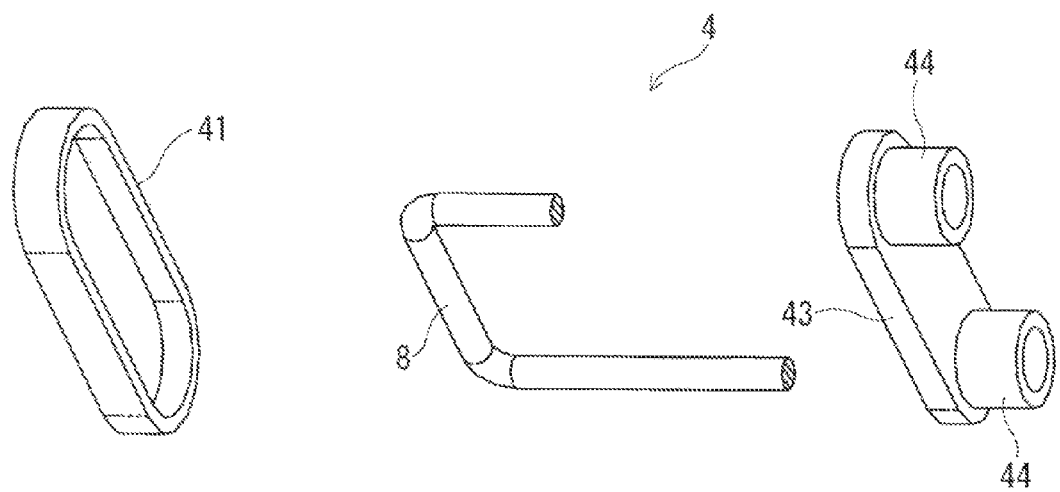
FIG. 22 is an exploded perspective view of the hinge mechanism.
Figure 23:
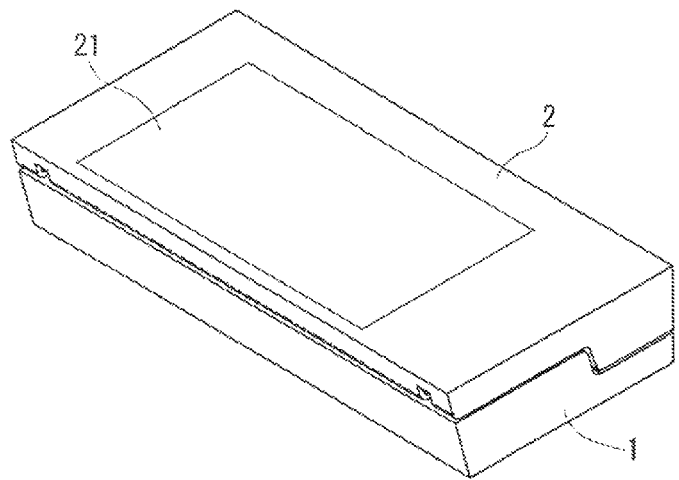
FIG. 23 is a perspective view of an open-close type compact electronic device in accordance with a second embodiment of the present invention with a second housing in a closed state.
Figure 24:
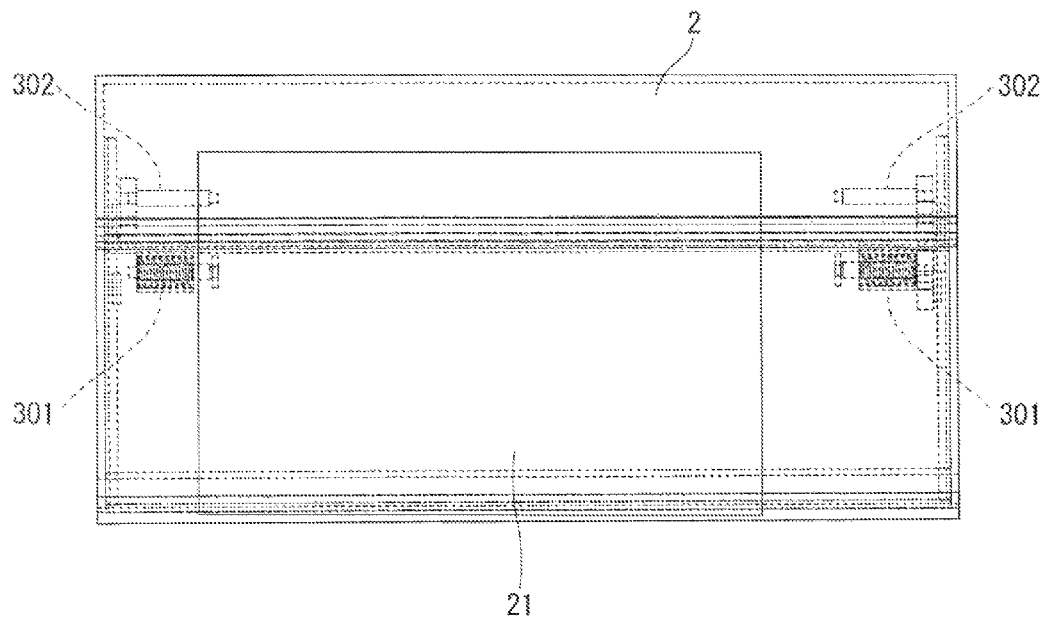
FIG. 24 is a plan view of the device in the same state as above.

As shown in FIGS. 21 and 22, the left hinge mechanism 4 comprises an arm 43 provided integrally with a pair of cylindrical parts 44, 44, and a cover 41 for accommodating the arm 43. A U-shaped cable 8 to be described later penetrates the hinge mechanism 4 from one of the cylindrical parts 44 of the arm 43 to the other.

As shown in FIG. 5, a groove 14 extending in the sliding direction of the second housing 2 is formed in a left end part of the first housing 1. The left hinge mechanism 4 slidably engages with the groove 14, and a lower cylindrical part 44 of the pair of cylindrical parts 44, 44 is connected to the first housing 1 so as to be rotatable relative thereto and to be slidable along the groove 14.

In contrast, an upper cylindrical part 44 of the left hinge mechanism 4 is connected to the second housing 2 so as to be rotatable relative thereto.

Figure 7:
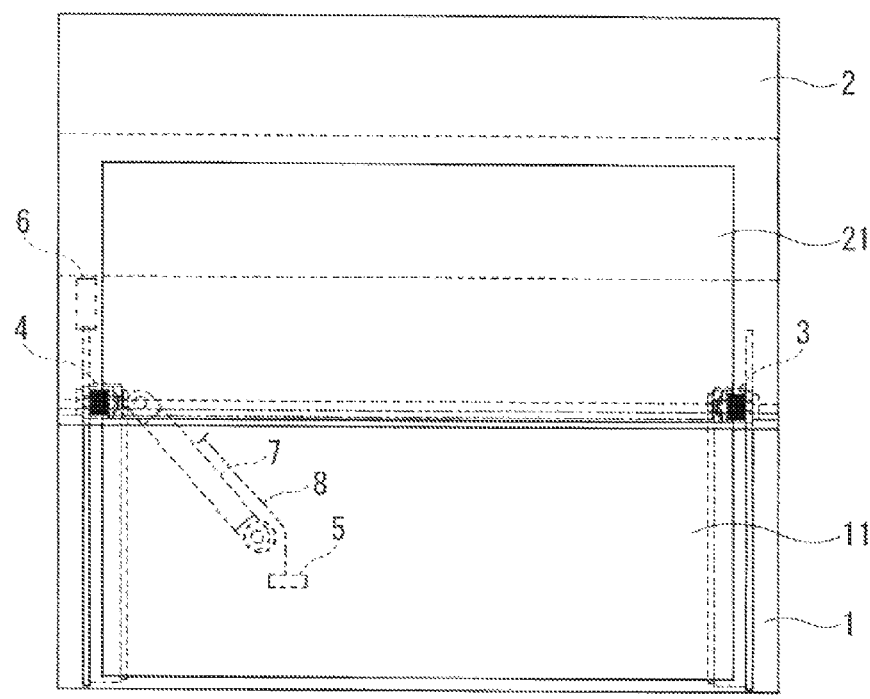
FIG. 7 is a plan view of the device in the same state as above.

Also, as shown in FIG. 7, the first display 11 and the second display 21 are electrically connected to each other through the cable 8. One end of the cable 8 is connected to a connector 5 on the first housing 1, and the other end of the cable 8 is connected to a connector 6 on the second housing 2.

The cable 8 extending from the connector 5 on the first housing 1 passes through the inside of the left hinge mechanism 4 to reach the connector 6 on the second housing 2.

A relative position between the left hinge mechanism 4 and the connector 6 on the second housing 2 does not change, but a relative position between the left hinge mechanism 4 and the connector 5 on the first housing 1 changes as the second housing 2 slides. Therefore, the length of the cable 8 extending between the hinge mechanism 4 and the connector 5 has an allowance, and a tension lever 7 is provided on the first housing 1 to absorb a slack due to the allowance.

The tension lever 7 includes a base end part pivoted on the first housing 1 and a tip end part guided along a guiding groove (not shown) extending to right and left on the first housing 1, and swings in association with the slide of the first housing 1 as to be described below.

In the closed state shown in FIGS. 1 to 4, the second housing 2 overlaps the first housing 1 so that the first display 11 is covered by the second housing 2 while the second display 21 is exposed.

Both hinge mechanisms 3, 4 are located at starting points of the respective grooves 13, 14 of the first housing 1 in an upright posture as shown in FIG. 5.

Figures 20A, 20B:
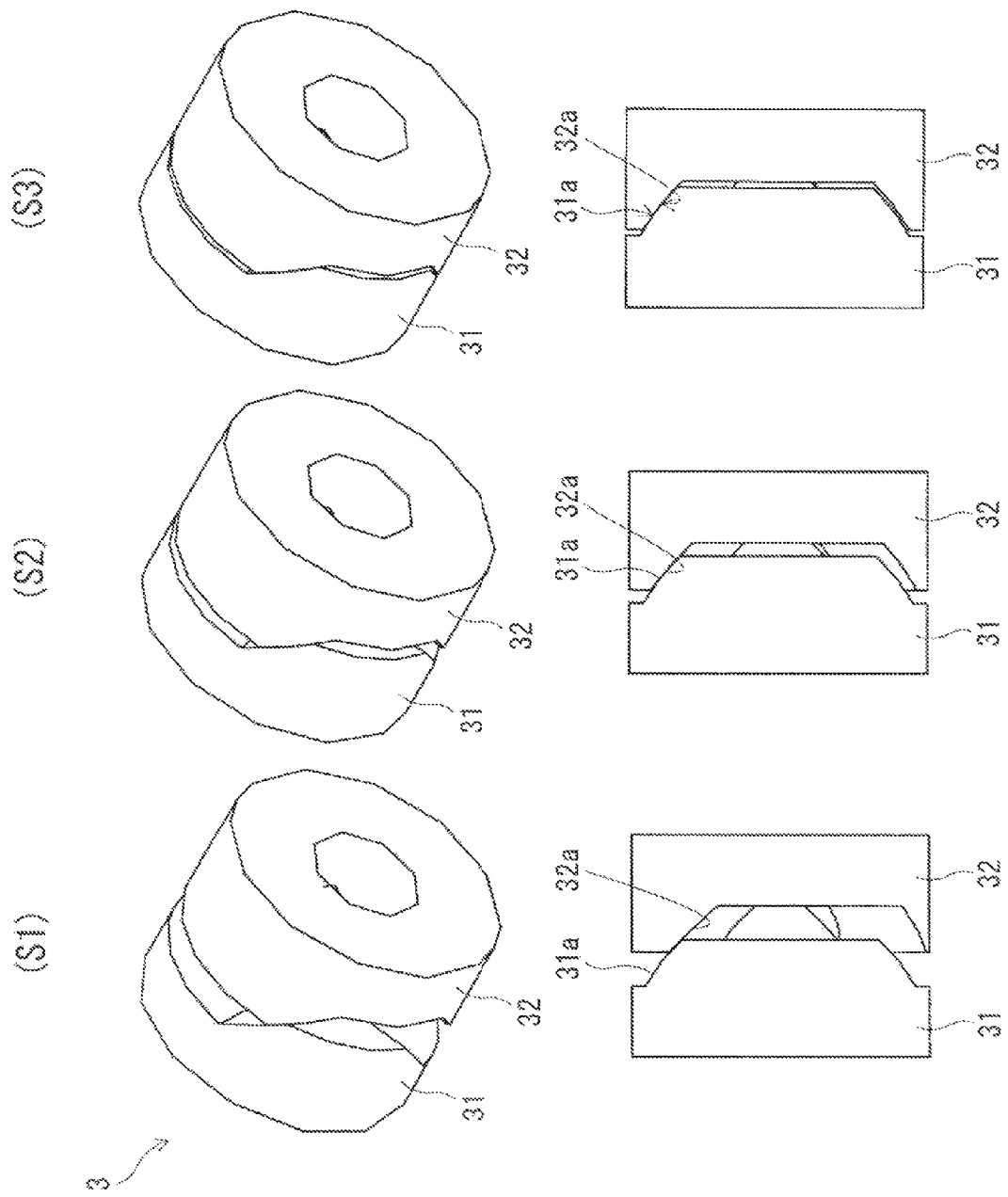
FIG. 20 is a series of perspective views (a) and front views (b) showing a cam operation of the hinge mechanism.

In this state, the first cam piece 31 and the second cam piece 32 of the right hinge mechanism 3 are in sliding contact with each other on respective cam faces 31a, 32a as shown in state S1 of FIGS. 20a and 20b.

The camming action of the cam faces 31a, 32a generates clockwise rotation torque on the second cam piece 32. This rotation torque is transmitted as driving force to the second housing 2 through the arm 37 of the hinge mechanism 3. However, this driving force is received by the front surface of the first housing 1, and the second housing 2 does not move.

Figure 2:
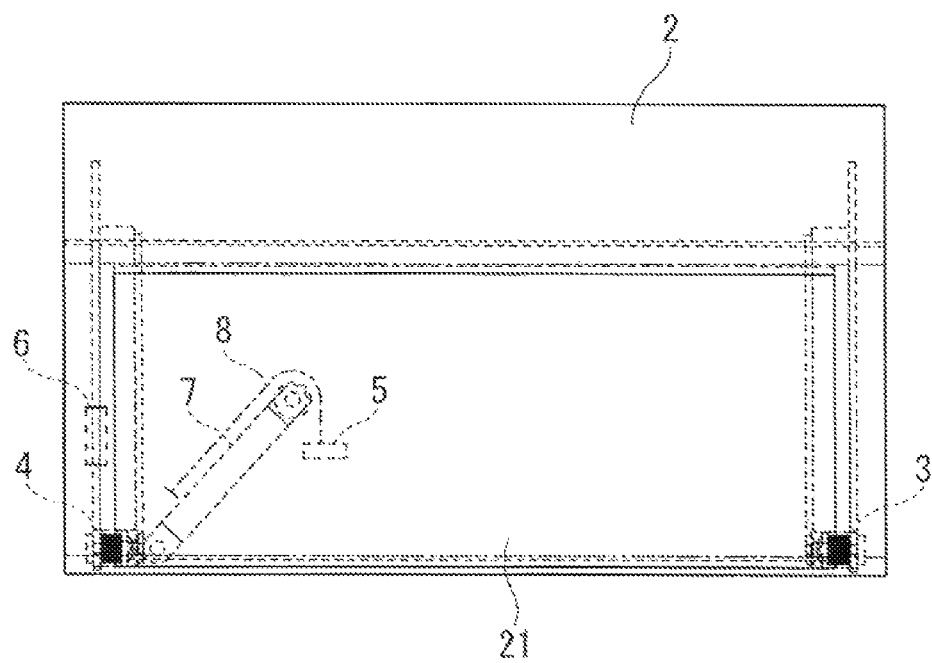
FIG. 2 is a plan view of the device in the same state as above.

Also, the tension lever 7 absorbs the slack of the cable 8 with such a posture that the tension lever 7 extends from a position adjacent to the hinge mechanism 4 to a position above the connector 5 as shown in FIG. 2.

When the second housing 2 is pressed from the closed state in the sliding direction, the second housing 2 slides along the front surface of the first display 11 of the first housing 1, to reach the intermediate state shown in FIGS. 6 to 9. In this sliding process, both the hinge mechanisms 3, move along the respective grooves 13, 14 of the first housing 1 while maintaining the upright posture to reach terminal positions of the grooves 13, 14 of the first housing 1 as shown in FIG. 10.

As shown in FIGS. 6 to 9, when the second housing 2 reaches the intermediate state, the first display 11 of the first housing 1 is exposed, with the first display 11 and the second display 21 having a difference in level therebetween.

Figure 8:
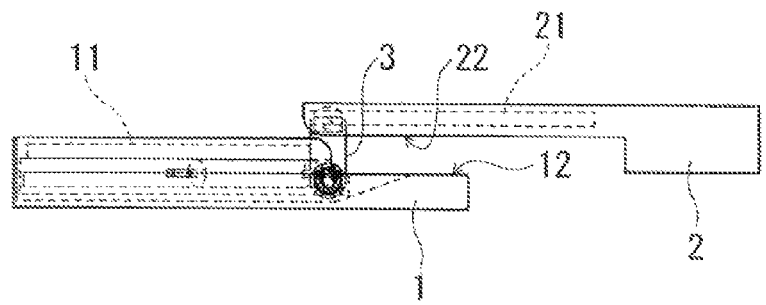
FIG. 8 is a right side view of the device in the same state as above.
Figure 9:
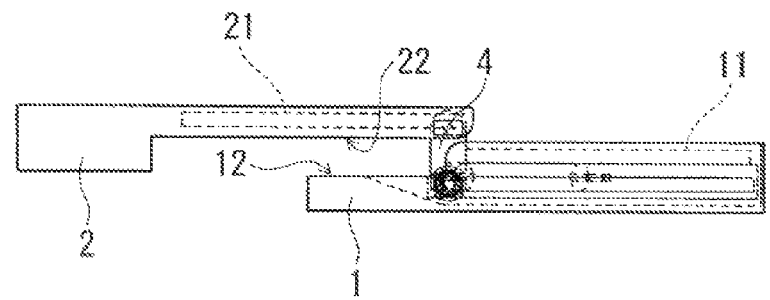
FIG. 9 is a left side view of the device in the same state as above.
Figure 10:
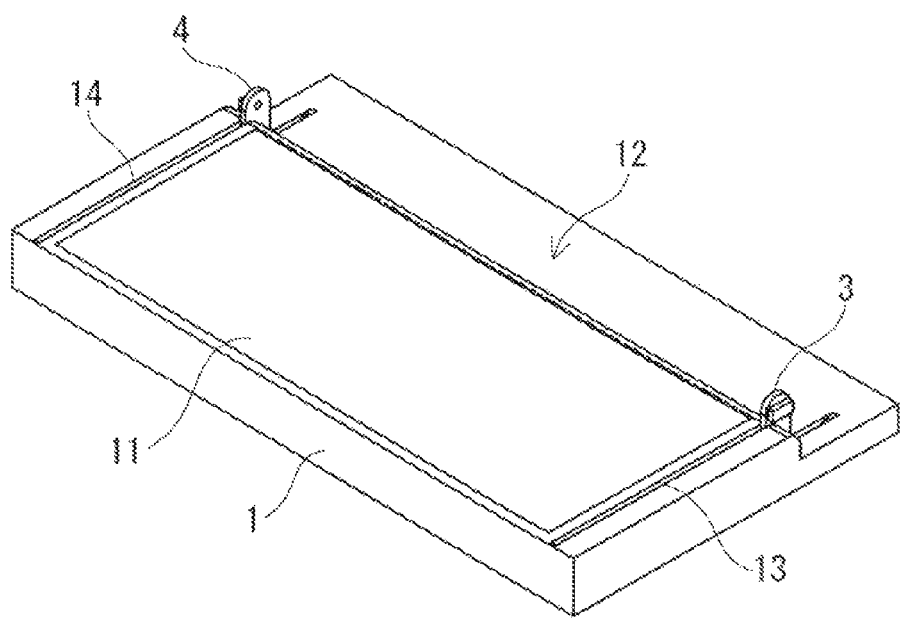
FIG. 10 is a perspective view indicating a position of the hinge mechanism of the device in the same state as above.
Figure 11:
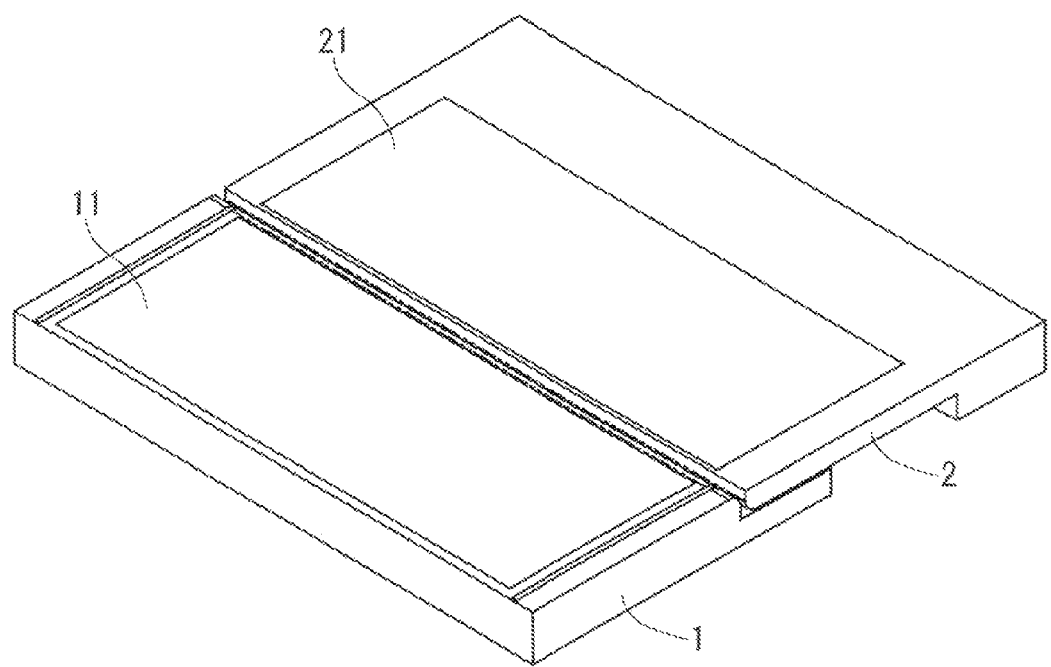
FIG. 11 is a perspective view of the open-close type compact electronic device in accordance with the first embodiment of the present invention with the second housing in an open state.

Also, when the second housing 2 reaches the intermediate state, the second housing 2 is released from being received on the front surface of the first housing 1 as shown in FIGS. 8 and 9.

At this point, the first cam piece 31 and the second cam piece 32 of the right hinge mechanism 3 are in sliding contact with each other on the respective cam faces 31a, 32a as shown in state S1 of FIGS. 20a and 20b, and the camming action of the cam faces 31a, 32a generates clockwise rotation torque on the second cam piece 32. This rotation torque is transmitted as driving force to the second housing 2 through the arm 37 of the hinge mechanism 3.

Therefore, the second housing 2 receives the driving force and rotates to reach the open state shown in FIGS. 11 to 14.

In the rotating step from the intermediate state to the open state, in the right hinge mechanism 3, the cam face 31a of the first cam piece 31 and the cam face 32a of the second cam piece 32 further slide relatively as shown in step S2 of FIGS. 20a and 20b. In this process also, the camming action of the cam faces 31a, 32a generates clockwise rotation torque on the second cam piece 32, and this rotation torque maintains the driving force for the second housing 2.

Figure 15:
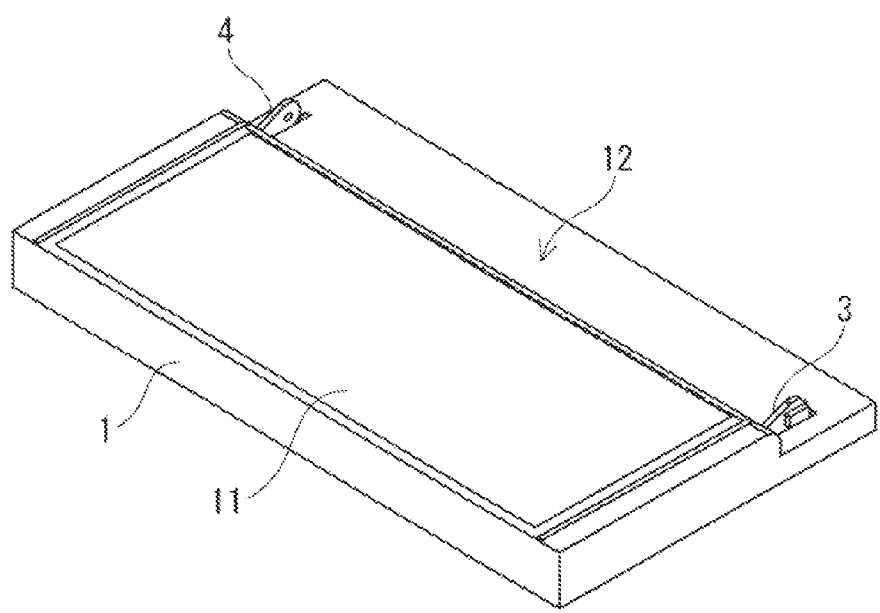
FIG. 15 is a perspective view indicating a position of the hinge mechanism of the device in the same state as above.

Thereafter, when the second housing 2 reaches the open state, both hinge mechanisms 3, 4 rotate at the terminal positions of the grooves 13, 14 of the first housing 1 so as to have a predetermined inclined posture as shown in FIG. 15. In the right hinge mechanism 3, the cam face 31a of the first cam piece 31 and the cam face 32a of the second cam piece 32 are in sliding contact with each other immediately before reaching a terminal of a cam curve as shown in state S3 of FIGS. 20a and 20b. Therefore, the camming action still works, and clockwise rotation torque on the second cam piece 32 is maintained.

Therefore, the driving force for the second housing 2 is maintained, and the contact surface 22 formed on the rear surface of the second housing 2 is thereby pressed against the contact surface 12 formed on the front surface of the first housing 1, and this press contact state is maintained.

As a result, in the open state of the second housing 2, the front surface of the second display 21 of the second housing 2 is flush with the front surface of the first display 11 of the first housing 1 on the same plane, and this state is held.

Figure 12:
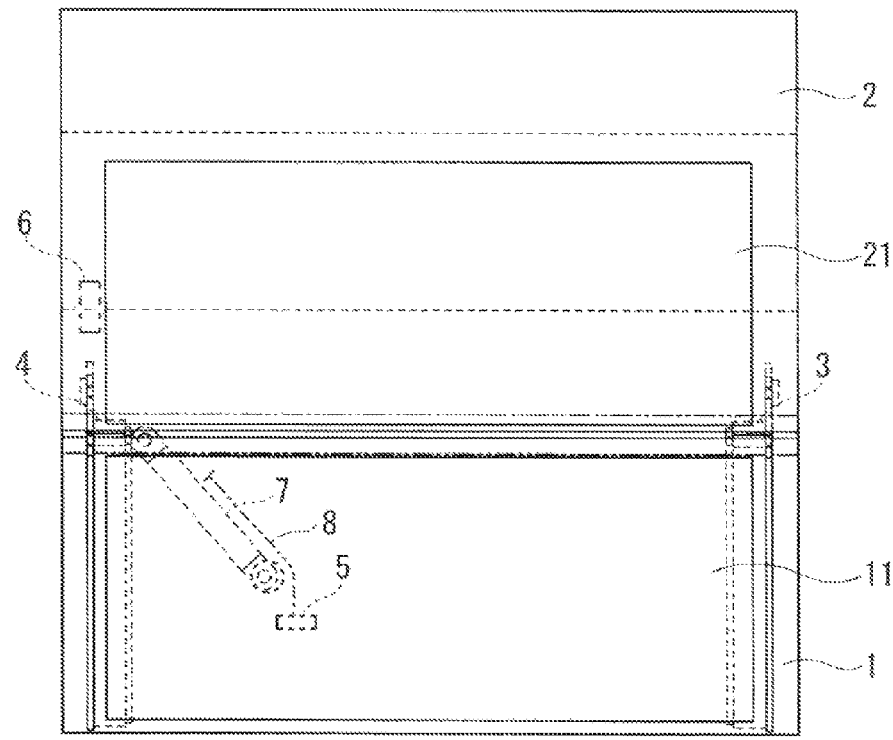
FIG. 12 is a plan view of the device in the same state as above.
Figure 13:
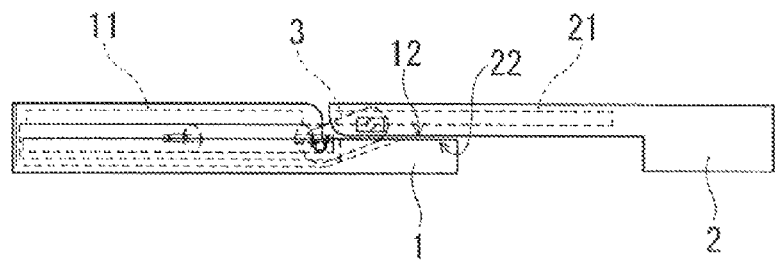
FIG. 13 is a right side view of the device in the same state as above.
Figure 14:
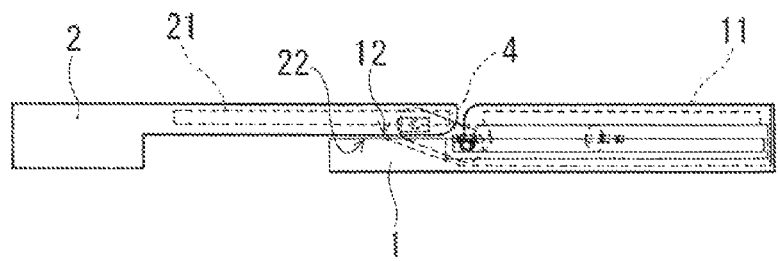
FIG. 14 is a left side view of the device in the same state as above.

Also, the tension lever 7 absorbs the slack of the cable 8 with such a posture that the tension lever 7 extends from the position adjacent to the hinge mechanism 4 to the position above the connector 5 as shown in FIG. 12.

When the second housing 2 is closed from the open state to the closed state, a reverse force is applied to the second housing 2. The second housing 2 thereby returns from the open state shown in FIG. 11 via the intermediate state shown in FIG. 6 to the closed state shown in FIG. 1.

Figure 31:
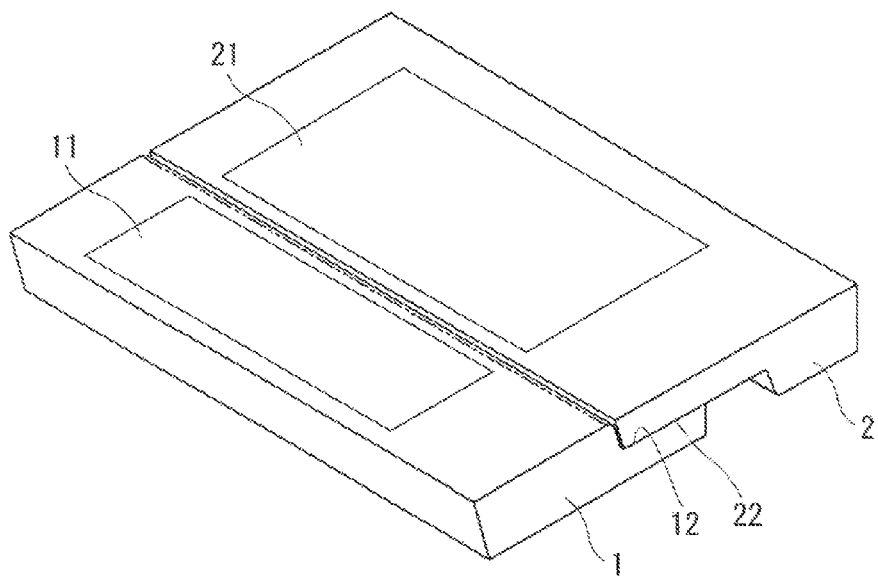
FIG. 31 is a perspective view of the open-close type compact electronic device in accordance with the second embodiment of the present invention with the second housing in an open state.
Figure 32:
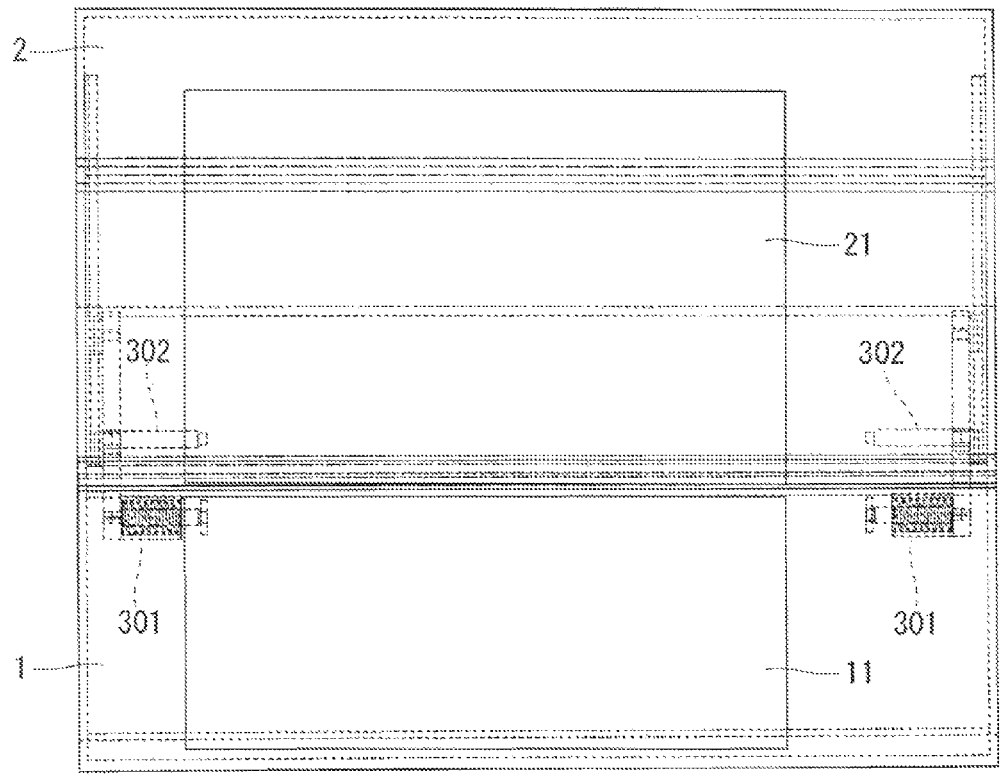
FIG. 32 is a plan view of the device in the same state as above.
Figure 33:
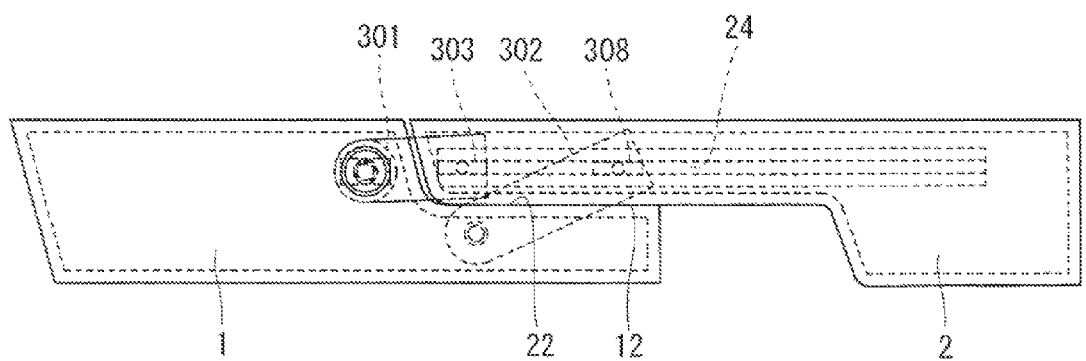
FIG. 33 is a right side view of the device in the same state as above.
Figure 34:
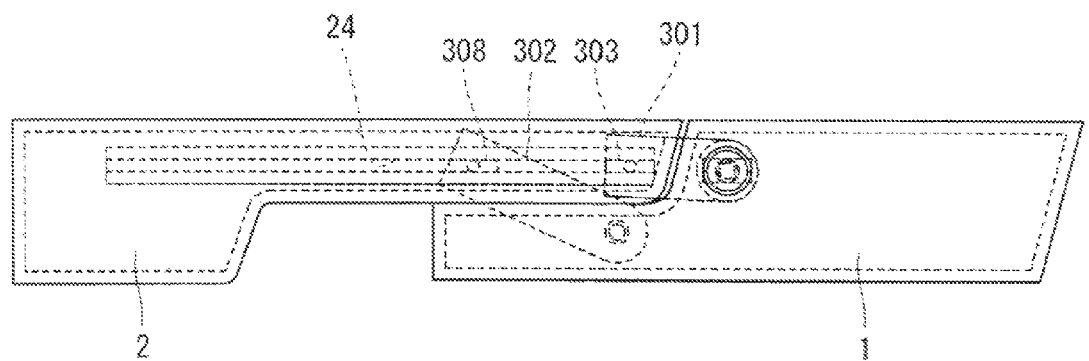
FIG. 34 is a left side view of the device in the same state as above.

An open-close type compact electronic device of a second embodiment of the present invention comprises a flat rectangular parallelepiped first housing 1 with a step and a flat rectangular parallelepiped second housing 2 with a step as shown in FIG. 31. The housings 1, 2 are connected so as to be movable relative to each other while they are arranged on one another.

A first display 11 is arranged on a front surface of the first housing 1, and a second display 21 is arranged on a front surface of the second housing 2.

Figure 27:
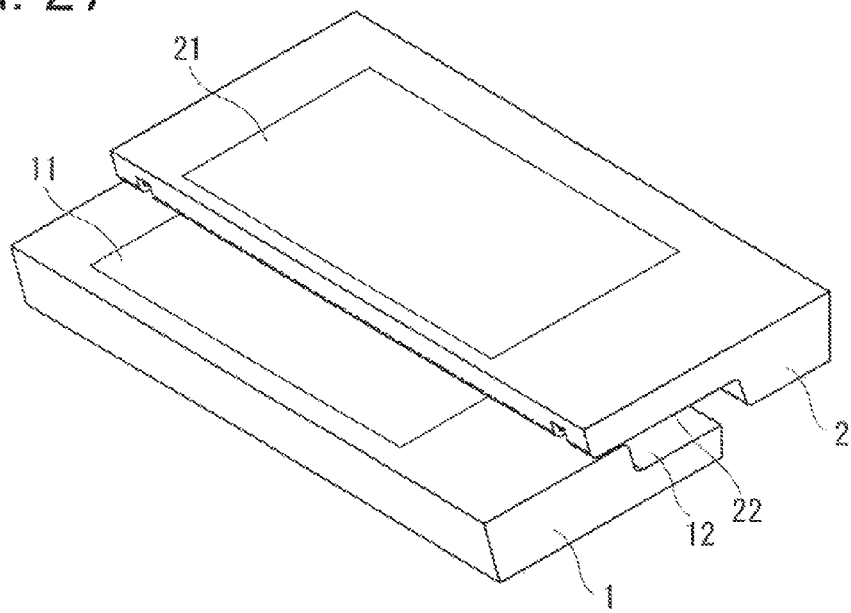
FIG. 27 is a perspective view of the open-close type compact electronic device in accordance with the second embodiment of the present invention with the second housing in an intermediate state.
Figure 28:
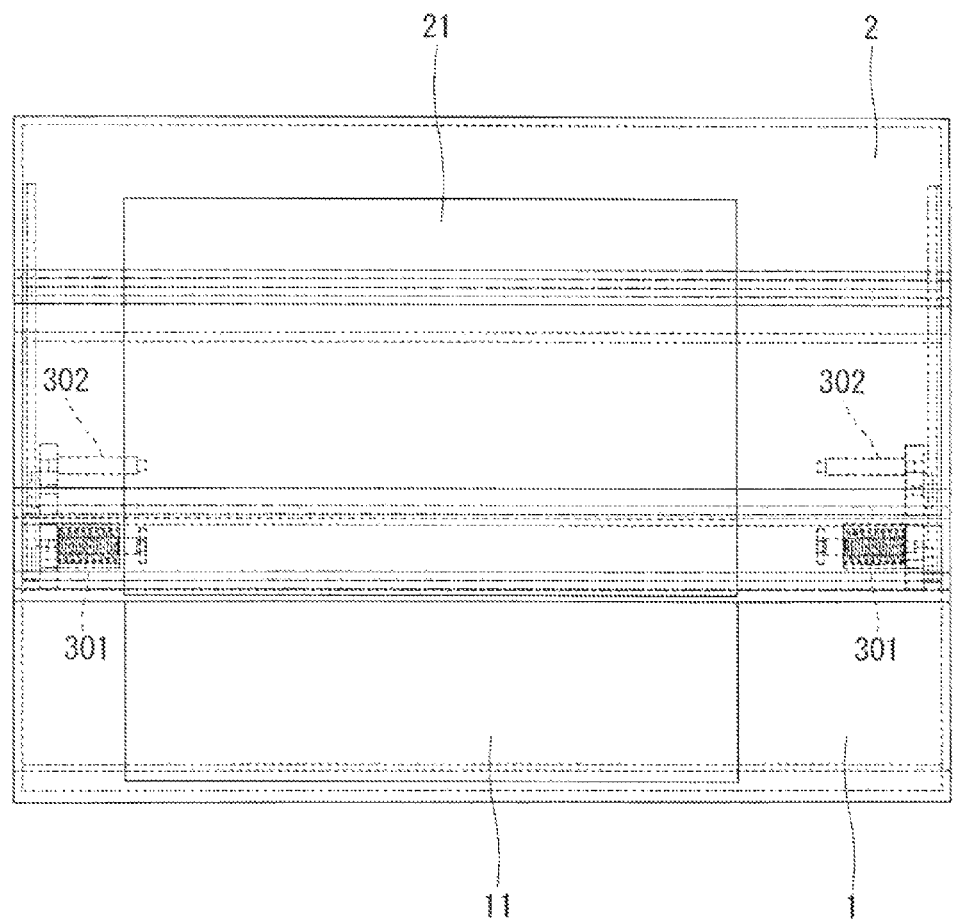
FIG. 28 is a plan view of the device in the same state as above.
Figure 29:
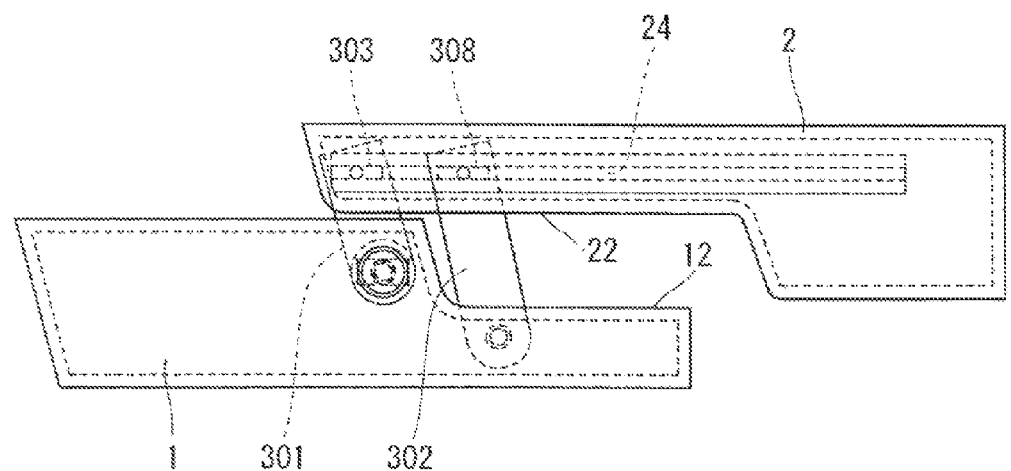
FIG. 29 is a right side view of the device in the same state as above.
Figure 30:
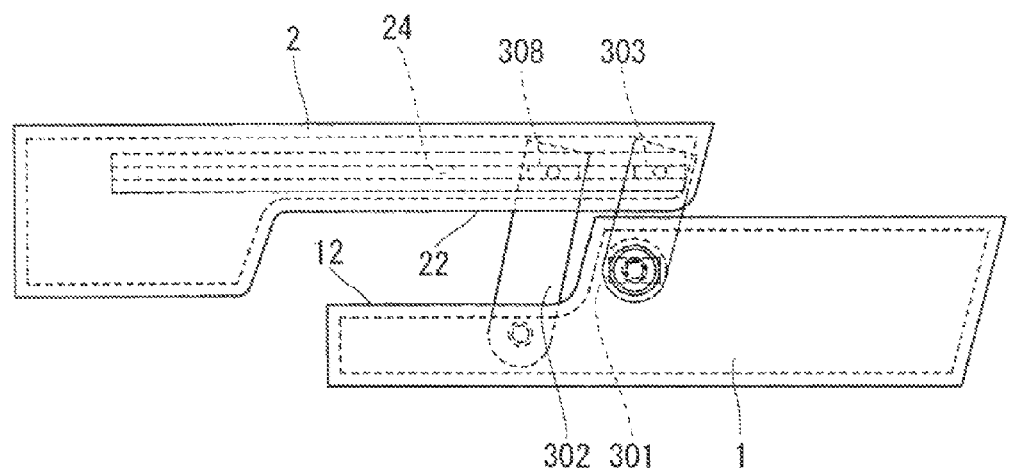
FIG. 30 is a left side view of the device in the same state as above.

Also, as shown in FIG. 27, a contact surface 12 parallel to a front surface of the first display 11 is formed on the front surface of the first housing 1 behind an area where the first display 11 is located, and a contact surface 22 parallel to a front surface of the second display 21 is formed on a rear surface of the second housing 2 at a position overlapping with an area where the second display 21 is located.

Thus, the first housing 1 and the second housing 2 can reciprocate among a closed state where the second housing 2 overlaps the first housing 1 so that the second housing 2 covers the first display 11 as shown in FIGS. 23 to 26, an intermediate state to which the second housing 2 slides along the front surface of the first display 11 of the first housing 1 to expose a part or all of the first display 11 as shown in FIGS. 27 to 30, and an open state to which the second housing rotates with respect to the first housing 1 so that the first display 11 and the second display 21 are flush with each other on the same plane as shown in FIGS. 31 to 34.

Figure 25:
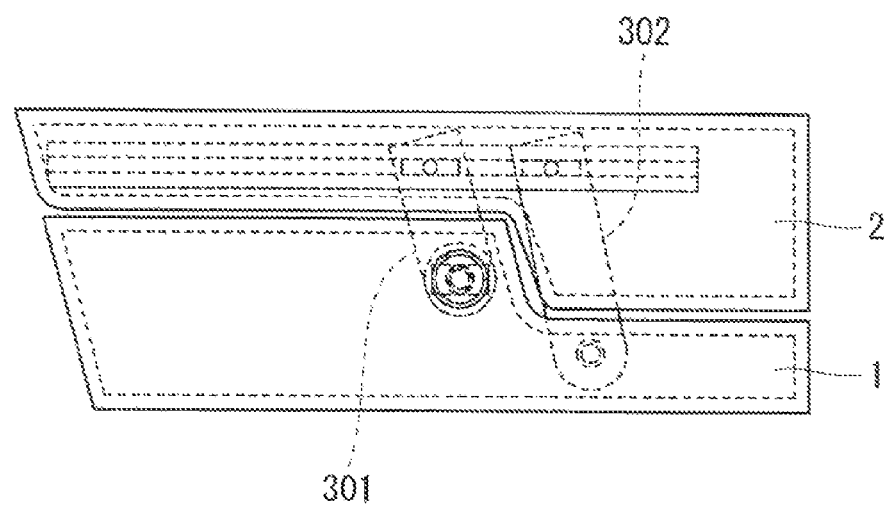
FIG. 25 is a right side view of the device in the same state as above.
Figure 26:
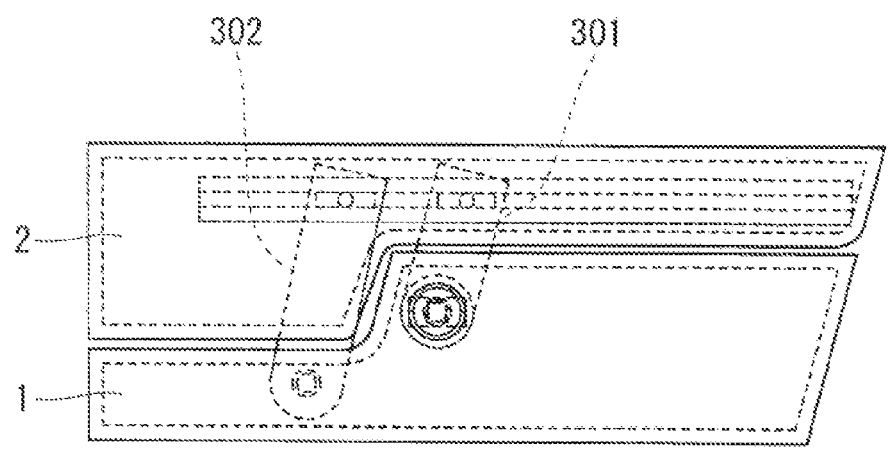
FIG. 26 is a left side view of the device in the same state as above.

As shown in FIG. 25, the first housing 1 and the second housing 2 are connected to each other by a first hinge mechanism 301 and a second hinge mechanism 302 on the right side, while, as shown in FIG. 26, the first housing 1 and the second housing 2 are connected to each other by a first hinge mechanism 301 and a second hinge mechanism 302 on the left side.

The right and left pair of first hinge mechanisms 301, 301 and the right and left pair of second hinge mechanisms 302, 302 arranged on either side of the first housing 1 and the second housing 2 each has a symmetric structure.

Figure 36:
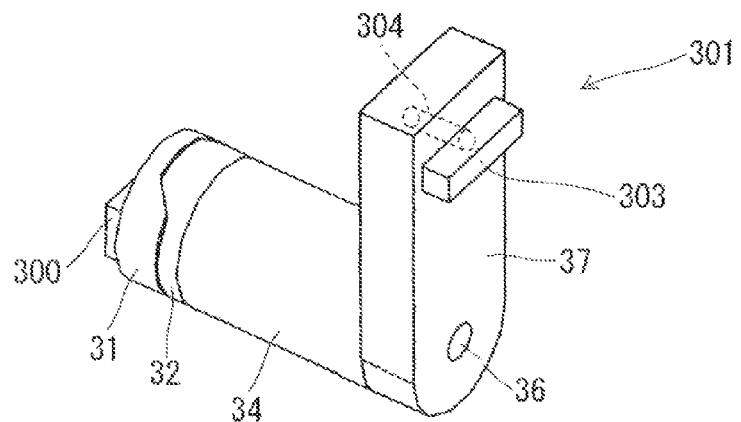
FIG. 36 is a perspective view of a first hinge mechanism of the open-close type compact electronic device in accordance with the second embodiment of the present invention.

The first hinge mechanism 301 has a similar structure to the hinge mechanism 3 shown in FIGS. 17 to 19, and comprises a first cam piece 31, a parallelepiped inner engaging piece 300 connected to the first cam piece 31 so as not to be rotatable relative thereto, a second cam piece 32 to be in sliding contact with the first cam piece 31, an arm 37 connected to the second cam piece 32 through a shaft 36 with an upright posture so as not to be rotatable relative thereto, a parallelepiped outer engaging piece 303 connected to a tip end part of the arm 37 through a shaft 304 so as to be rotatable relative thereto, a coil spring (not shown) pressing the second cam piece 32 against the first cam piece 31, and a cylindrical member 34 for accommodating the coil spring as shown in FIG. 36.

Figure 37:
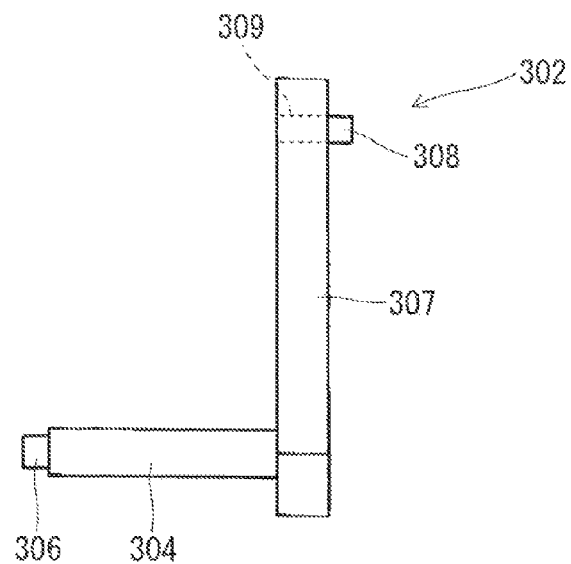
FIG. 37 is a front view of a second hinge mechanism of the open-close type compact electronic device in accordance with the second embodiment of the present invention.
Figure 38:
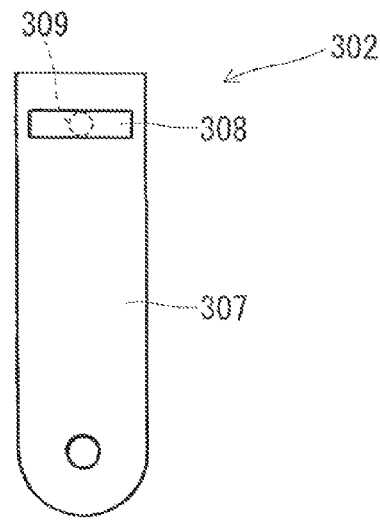
FIG. 38 is a right side view of the second hinge mechanism.

In contrast, the second hinge mechanism 302 comprises a shaft 304, a parallelepiped inner engaging piece 306 connected to an end part of the shaft 304 so as to be rotatable relative thereto, an arm 307 connected to the other end part of the shaft 304 with an upright posture so as not to be rotatable relative thereto, and a parallelepiped outer engaging piece 308 connected to a tip end part of the arm 307 through a shaft 309 so as to be rotatable relative thereto as shown in FIGS. 37 and 38.

Figure 39:
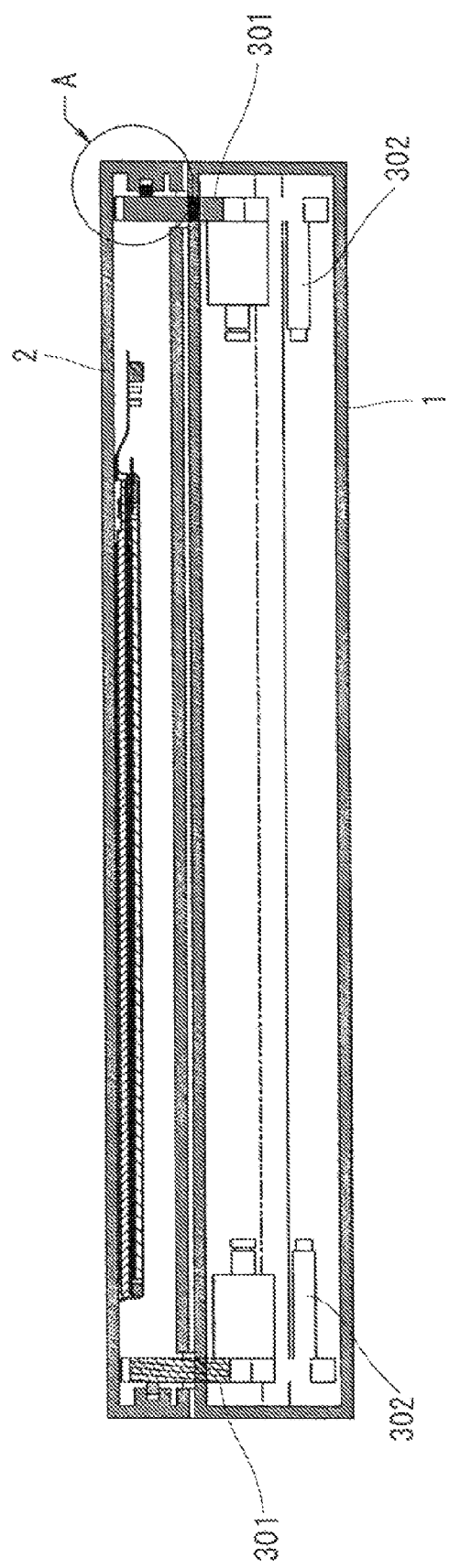
FIG. 39 is a cross sectional view showing an essential part of the open-close type compact electronic device in accordance with the second embodiment of the present invention.
Figure 40:
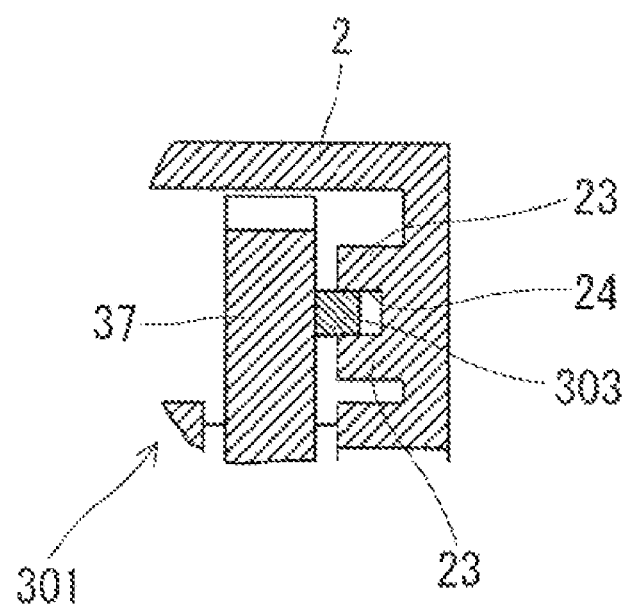
FIG. 40 is a cross sectional view showing A section of FIG. 39 in an enlarged manner.

As shown in FIGS. 39 and 40, an inner surface of a side wall of the second housing 2 is provided with a pair of projections 23, 23 extending along the sliding direction of the second housing 2. The outer engaging piece 303 of the first hinge mechanism 301 is slidably engaged with a groove 24 defined between the projections 23, 23.

Also, the inner engaging piece 300 of the first hinge mechanism 301 shown in FIG. 36 is engaged with the first housing 1 so as not to be slidable or rotatable relative thereto.

Similarly in the second hinging assembly 302 shown in FIGS. 37 and 38, the outer engaging piece 308 is slidably engaged with a groove (not shown) formed in the second housing 2, and the inner engaging piece 306 is engaged with the first housing 1 so as not to be slidable or rotatable relative thereto.

In the closed state shown in FIGS. 23 to 26, the second housing 2 overlaps the first housing 1 so that the first display 11 is covered by the second housing 2 while the second display 21 is exposed.

Figure 35A:
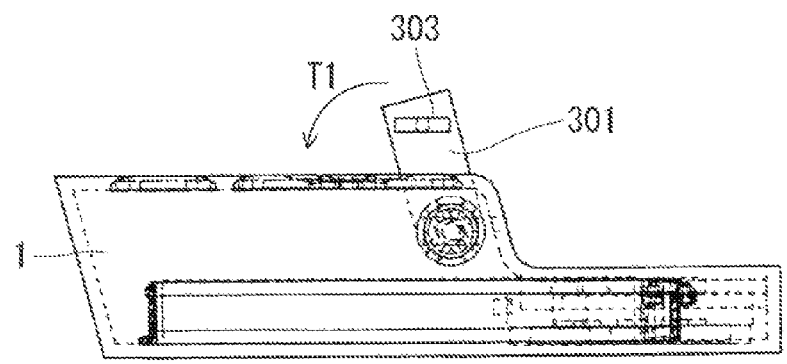
FIG. 35 are a series of right side views for explaining an operation of the hinge mechanism of the open-close type compact electronic device in accordance with the second embodiment of the present invention.
Figure 35B:
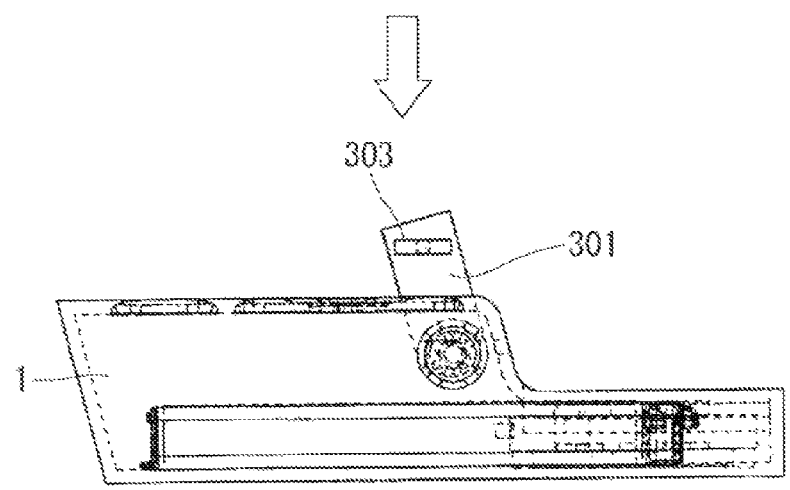

In this state, the first cam piece 31 and the second cam piece 32 of the first hinge mechanism 301 shown in FIG. 36 are in sliding contact with each other in an inclined area of the cam curve. The camming action generates counterclockwise rotation torque T1 as shown in FIG. 35*a*. This rotation torque is transmitted as driving force to the second housing 2 shown in FIG. 25, thereby pressing the rear surface of the second housing 2 against the front surface of the first housing 1 to maintain the second housing 2 in the closed state.

When the second housing 2 is pressed from the closed state in the sliding direction, the second housing 2 slides along the front surface of the first display 11 of the first housing 1, to reach the intermediate state shown in FIGS. 27 to 30. In this sliding step, the outer engaging pieces 303, 308 of the first and second hinge mechanisms 301, 302 slide relative to the groove 24 of the second housing 2, with the hinge mechanisms 301, 302 maintaining the same posture. Thus, the second housing 2 moves horizontally from the closed state toward the intermediate state.

In this process, the position of the sliding contact between the first cam piece 31 and the second cam piece 32 of the first hinge mechanism 301 moves from an inclined area via a flat area to the opposite inclined area of the cam curve, thereby reversing the urging direction by the coil spring.

As shown in FIG. 27, when the second housing 2 reaches the intermediate state, a part or all of the first display 11 of the first housing 1 is exposed, with the first display 11 and the second display 21 having a difference in level therebetween.

Figure 35C:
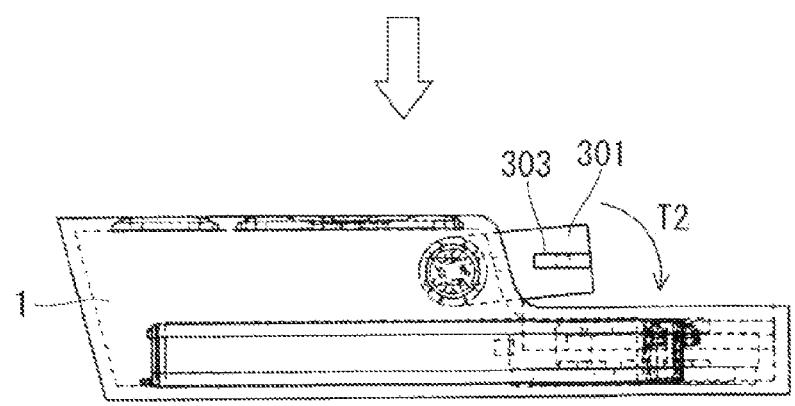

Also, when the second housing 2 reaches the intermediate state, the first cam piece 31 and the second cam piece 32 of the first hinge mechanism 301 are in sliding contact with each other in an inclined area of the cam curve, and the camming action generates clockwise rotation torque T2 as shown in FIG. 35*c*. This rotation torque is transmitted as driving force to the second housing 2 shown in FIG. 33, and the second housing 2 thereby rotates to reach the open state shown in FIGS. 31 to 34. Then finally, the contact surface 22 of the second housing 2 is pressed against the contact surface of the first housing 1, thereby maintaining the second housing 2 in the open state.

As a result, in the open state of the second housing 2, the front surface of the second display 21 of the second housing 2 is flush with the front surface of the first display 11 of the first housing 1 on the same plane, and this state is held.

As described above, with the open-close type compact electronic device in accordance with the present invention, information can be displayed on the second display 21 with both the first and second housings 1, 2 closed, and furthermore, with both housings 1, 2 open, information can be displayed on both the first display 11 and the second display 21, and continuousness of an image can be kept when the image is displayed over the displays 11, 21.

Also, because the contact surfaces 12, 22 of the first housing 1 and the second housing 2 are widely formed in a direction parallel to the front surfaces of the first display 11 and the second display 21, the postures of both displays 11, 21 in a state where both the contact surfaces 12, 22 are pressed against each other are more stable.

Further, according to the second embodiment of the present invention shown in FIGS. 23 to 40, the first hinge mechanism 301 and the second hinge mechanism 302 which rotate simultaneously are provided on both sides of the first and second housings 1, 2 to form a four-joint link mechanism. Therefore, the posture of the second housing 2 relative to the first housing 1 is stable in the sliding and rotating steps, thereby ensuring the position and posture of the second housing 2 in both the closed state and open state.

The present invention is not limited to the foregoing embodiment in construction but can be modified variously within the technical scope as set forth in the appended claims.

Figure 41A:
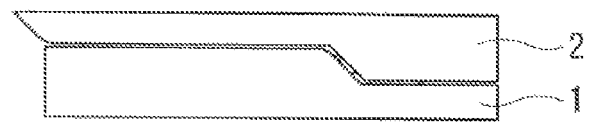
FIG. 41 are side views showing another configuration of a pair of contact surfaces.
Figure 41B:
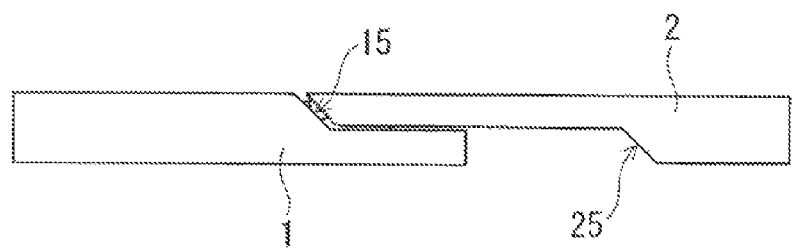

For example, as shown in FIGS. 41a and 41b, engagement surfaces 15, 25 which should face each other when the first housing 1 and the second housing 2 are closed can be formed so as to be inclined surfaces with respect to a display surface.

Figure 42A:
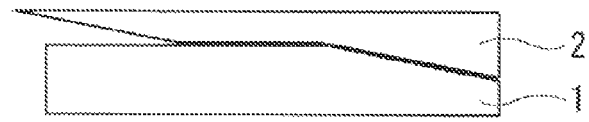
FIG. 42 are side views showing a further configuration of the pair of contact surfaces.
Figure 42B:
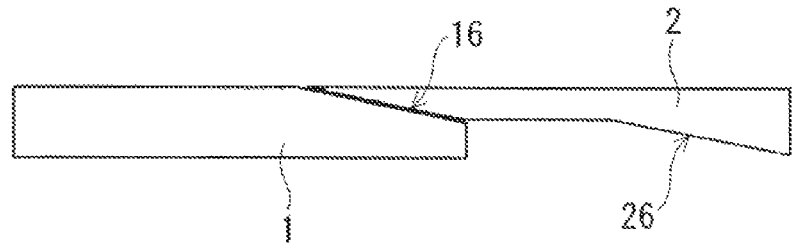

Also, as shown in FIGS. 42a and 42b, contact surfaces 16, 26 which should be pressed against each other when the first housing 1 and the second housing 2 are open can be formed so as to be inclined surfaces with respect to the display surface.

Also, in the embodiment described above, explained is the structure in which the displays 11, 21 are arranged on the respective front surfaces of the first housing 1 and the second housing 2. However, the present invention is not limited to such a structure. For example, other function parts such as a key operation part for input may be provided on the front surfaces of the first housing 1 and the second housing 2, instead of the displays 11, 21, or additionally to the displays 11, 21.

Further, one of or both the displays 11, 21 may include a touch panel function for inputting information for device control by touching with input operation means such as a finger, pen or the like. In such a case, example of the touch panel which can be used includes Surface Capacitive Type, Projected Capacitive Type, Electromagnetic Induction Type, Infrared Type, Resistive Type, Surface Acoustic Type and the like.

What is claimed is:

1. An open-close-type compact electronic device comprising:
   a first housing comprising a first front surface and first contact surface; and
   a second housing comprising a second front surface and a second contact surface;
   wherein the first housing and the second housing are connected by a connecting mechanism such that the first housing and the second housing can move relative to each other between a closed state and an open state;
   wherein, in the closed state, the first front surface is covered by the second housing;
   wherein, in the open state, the first front surface and the second front surface are arranged on generally the same plane and exposed, and the first contact surface and the second contact surface are in contact with each other by being urged by an urging unit;
   wherein the relative movement from the closed state to the open state includes a sliding step and a rotating step;
   wherein, in the sliding step, the second housing slides from the closed state along the first front surface to reach an intermediate state;
   wherein, in the rotating step, the second housing rotates from the intermediate state to reach the open state;
   wherein the connecting mechanism includes a hinge mechanism which guides the slide of the second housing with respect to the first housing in the sliding step and rotates the second housing with respect to the first housing in the rotating step; and
   wherein the hinge mechanism comprises
   a first cam piece which is linked to the first housing and slidable in a sliding direction of the second housing, the sliding direction being different from a direction of a rotation axis in the rotating step,
   an arm which includes a tip end part linked to the second housing so as to be rotatable relative thereto and slidable along the sliding direction of the second housing, and a base end part around which the arm can rotate about an axis perpendicular to the sliding direction of the second housing, wherein at least a part of the arm is covered by the second housing, and
   a second cam piece which is linked to the base end part of the arm so as not to be rotatable relative thereto, and
   the urging unit comprising a spring which urges the second housing toward the closed state with respect to the first housing in the rotating step,
   wherein a cam face of the first cam piece and a cam face of the second cam piece are in sliding contact so as to be rotatable relative to each other,
   wherein the cam pieces are urged by the spring in such a direction that the cam faces are pressed to each other, and
   wherein camming action of the cam faces drives the second housing toward the closed state.

2. The device of claim 1, wherein the hinge mechanism and the first housing and the second housing form a four-joint link mechanism.

3. An open-close-type compact electronic device comprising:
   a first housing comprising a first front surface and a first contact surface, wherein the first front surface comprises a first display; and
   a second housing comprising a second front surface and a second contact surface, wherein the second front surface comprises a second display;
   wherein the first housing and the second housing are connected by a connecting mechanism such that the first housing and the second housing can move relative to each other between a closed state and an open state;
   wherein, in the closed state, the first display is covered by the second housing and the second display is exposed;
   wherein, in the open state, the first display and the second display are arranged on generally the same plane and exposed, and the first contact surface and the second contact surface are in contact with each other by being urged by an urging unit;
   wherein the relative movement from the closed state to the open state includes a sliding step and a rotating step;
   wherein, in the sliding step, the second housing slides from the closed state along the first front surface to reach an intermediate state;

wherein, in the rotating step, the second housing rotates from the intermediate state to reach the open state;

wherein the connecting mechanism includes a hinge mechanism which guides the slide of the second housing with respect to the first housing in the sliding step and rotates the second housing with respect to the first housing in the rotating step; and wherein the hinge mechanism comprises a first cam piece which is linked to the first housing and slidable in a sliding direction of the second housing, the sliding direction being different from a direction of a rotating axis in the rotating step;

an arm which includes a tip end part linked to the second housing so as to be rotatable relative thereto and slidable along the sliding direction of the second housing, and a base end part around which the arm can rotate about an axis perpendicular to the sliding direction of the second housing, wherein at least a part of the arm is covered by the second housing, a second cam piece which is linked to the base end part of the arm so as not to be rotatable relative thereto, and the urging unit comprising a spring which urges the second housing toward the closed state with respect to the first housing in at least a final step of the rotating step, wherein a cam face of the first cam piece and a cam face of the second cam piece are in sliding contact so as to be rotatable relative to each other, wherein the cam pieces are urged by the spring in such a direction that the cam faces are pressed to each other, and wherein camming action of the cam faces drives the second housing toward the closed state.

4. The device of claim 3, wherein the first contact surface is parallel to the first display and the second contact surface is parallel to the second display.

5. The device of claim 3, wherein the hinge mechanism and the first housing and the second housing form a four-joint link mechanism.

6. An open-close-type compact electronic device comprising:

a first housing comprising a first front surface and a first contact surface; and a second housing comprising a second front surface and a second contact surface;

wherein the first housing and the second housing are connected by a connecting mechanism such that the first housing and the second housing can move relative to each other between a closed state and an open state;

wherein, in the closed state, the first front surface is covered by the second housing;

wherein, in the open state, the first front surface and the second front surface are arranged on generally the same plane and exposed, and the first contact surface and the second contact surface are in contact with each other by being urged by an urging unit;

wherein the relative movement from the closed state to the open state includes a sliding step and a rotating step;

wherein, in the sliding step, the second housing slides from the closed state along the first front surface to reach an intermediate state;

wherein, in the rotating step, the second housing rotates from the intermediate state to reach the open state;

wherein the connecting mechanism includes a hinge mechanism which guides the slide of the second housing with respect to the first housing in the sliding step and rotates the second housing with respect to the first housing in the rotating step; and wherein the hinge mechanism comprises a first cam piece which is linked to the first housing so as not to be rotatable relative thereto, and slidable in a sliding direction of the second housing, the sliding direction being different from a direction of a rotating axis in the rotating step, an arm which includes a tip end part linked to the second housing so as to be rotatable relative thereto and slidable along the sliding direction of the second housing, and a base end part around which the arm can rotate about an axis perpendicular to the sliding direction of the second housing, wherein at least a part of the arm is covered by the second housing, a second cam piece which is linked to the base end part of the arm so as not to be rotatable relative thereto, and the urging unit comprising a spring which urges the second housing toward the closed state with respect to the first housing in at least a final step of the rotating step, wherein a cam face of the first cam piece and a cam face of the second cam piece are in sliding contact so as to be rotatable relative to each other, wherein the cam pieces are urged by the spring in such a direction that the cam faces are pressed to each other, and wherein camming action of the cam faces drives the second housing toward the closed state.

7. The device of claim 6, wherein the hinge mechanism and the first housing and the second housing form a four-joint link mechanism.

8. An open-close-type compact electronic device comprising:

a first housing comprising a first front surface and a first contact surface, wherein the first front surface comprises a first display; and a second housing comprising a second front surface and a second contact surface, wherein the second contact surface comprises a second display;

wherein the first housing and the second housing are connected by a connecting mechanism such that the first housing and the second housing can move relative to each other between a closed state and an open state;

wherein, in the closed state, the first display is covered by the second housing and the second display is exposed;

wherein, in the open state, the first display and the second display are arranged on generally the same plane and exposed, and the first contact surface and the second contact surface are in contact with each other by being urged by an urging unit;

wherein the relative movement from the closed state to the open state includes a sliding step and a rotating step;

wherein, in the sliding step, the second housing slides from the closed state along the first front surface to reach an intermediate state;

wherein, in the rotating step, the second housing rotates from the intermediate state to reach the open state;

wherein the connecting mechanism includes a hinge mechanism which guides the slide of the second housing with respect to the first housing in the sliding step and rotates the second housing with respect to the first housing in the rotating step;

wherein the hinge mechanism comprises a first cam piece which is linked to the first housing so as not to be rotatable relative thereto, and slidable in a sliding direction of the second housing, the sliding direction being different from a direction of a rotating axis in the rotating step, an arm which includes a tip end part linked to the second housing so as to be rotatable relative thereto and slidable along the sliding direction of the second housing and a base end part around which the arm can rotate about an axis perpendicular to the sliding direction of the second housing, wherein at least a part of the arm is covered by the second housing, a second cam piece which is linked to the base end part of the arm so as not to be rotatable relative thereto, and the urging unit comprising a spring which urges the second housing toward the closed state with respect to the first housing in at least a final step of the rotating step, wherein a cam face of the first cam piece and a cam face of the second cam piece are in sliding contact so as to be rotatable relative to each other, wherein the cam pieces are urged by the spring in such a direction that the cam faces are pressed to each other, and wherein camming action of the cam faces drives the second housing toward the closed state.

9. The device of claim 8, wherein the first contact surface is parallel to the first display and the second contact surface is parallel to the second display.

10. The device of claim 8, wherein the hinge mechanism and the first housing and the second housing form a four-joint link mechanism.

* * * * *